(12) United States Patent
Li et al.

(10) Patent No.: US 8,078,487 B2
(45) Date of Patent: Dec. 13, 2011

(54) WORKFLOW SCHEDULER

(75) Inventors: Yang Li, Ipswich (GB); Simon Giles Thompson, Ipswich (GB); Nick Giles, York (GB); Hamid Gharib, Ipswich (GB)

(73) Assignee: British Telecommunications plc, London (GB)

( * ) Notice: Subject to any disclaimer, the term of this patent is extended or adjusted under 35 U.S.C. 154(b) by 1250 days.

(21) Appl. No.: 11/727,843

(22) Filed: Mar. 28, 2007

(65) Prior Publication Data

US 2007/0174101 A1     Jul. 26, 2007

Related U.S. Application Data

(63) Continuation-in-part of application No. PCT/GB2005/004734, filed on Dec. 9, 2005.

(30) Foreign Application Priority Data

Dec. 10, 2004  (GB) .................................... 0427133.4
Mar. 28, 2006  (GB) .................................... 06251666

(51) Int. Cl.
*G06Q 10/00*  (2006.01)

(52) U.S. Cl. ............... 705/7.22; 705/7.21; 705/7.12; 705/7.11; 700/99; 700/100; 717/101

(58) Field of Classification Search ........ 705/7.11–7.27; 703/2; 717/101; 700/99–100
See application file for complete search history.

(56) References Cited

U.S. PATENT DOCUMENTS

| | | | | |
|---|---|---|---|---|
| 5,093,794 A | * | 3/1992 | Howie et al. ................ 700/100 |
| 5,212,791 A | * | 5/1993 | Damian et al. .............. 705/29 |
| 5,408,663 A | * | 4/1995 | Miller ....................... 718/104 |
| 5,630,069 A | | 5/1997 | Flores et al. |
| 5,754,857 A | | 5/1998 | Gadol |
| 5,765,140 A | * | 6/1998 | Knudson et al. ............. 705/9 |
| 5,848,403 A | * | 12/1998 | Gabriner et al. ............ 706/13 |
| 5,918,226 A | * | 6/1999 | Tarumi et al. ............... 1/1 |
| 6,031,984 A | * | 2/2000 | Walser ..................... 703/2 |
| 6,115,640 A | * | 9/2000 | Tarumi ..................... 700/99 |
| 6,415,259 B1 | * | 7/2002 | Wolfinger et al. ............ 705/8 |
| 6,519,763 B1 | * | 2/2003 | Kaufer et al. ............... 717/101 |
| 6,609,100 B2 | * | 8/2003 | Smith et al. ................ 705/8 |
| 7,028,303 B2 | * | 4/2006 | Lahey et al. ................ 718/106 |

(Continued)

FOREIGN PATENT DOCUMENTS

EP       0 778 535     6/1997

(Continued)

OTHER PUBLICATIONS

ILOG Solver Product Data Sheet, Oct. 2004 ILOG.S.A.*

(Continued)

*Primary Examiner* — Lynda Jasmin
*Assistant Examiner* — Alan S Miller
(74) *Attorney, Agent, or Firm* — Nixon & Vanderhye PC

(57) ABSTRACT

An interactive workflow schedule optimizer arranged to enable a user to reconfigure an instantiated workflow for a task comprising a plurality of actions having a predetermined dependency relationship to each other. The optimizer comprises means to input one or more user-specified constraint conditions into the workflow schedule optimizer; means to regenerate a workflow dependent on user specified condition from the instantiated workflow, the regenerated workflow satisfying said one or more user-specified constraint conditions. The optimizer optimises the global utilisation of the resources required to fulfil the user request by processing in parallel the resource requirements of each of said plurality of actions required by the regenerated workflow.

6 Claims, 18 Drawing Sheets

U.S. PATENT DOCUMENTS

| | | | |
|---|---|---|---|
| 7,386,465 B1* | 6/2008 | Friedland et al. | 705/9 |
| 7,865,867 B2* | 1/2011 | Keene Potter et al. | 717/101 |
| 2002/0016729 A1 | 2/2002 | Breitenbach et al. | |
| 2002/0095391 A1 | 7/2002 | Swart et al. | |
| 2003/0115073 A1 | 6/2003 | Todd et al. | |
| 2004/0078258 A1* | 4/2004 | Schulz et al. | 705/9 |
| 2004/0083448 A1* | 4/2004 | Schulz et al. | 717/101 |
| 2004/0128173 A1 | 7/2004 | Salonen | |
| 2005/0108074 A1* | 5/2005 | Bloechl et al. | 705/8 |
| 2005/0209732 A1* | 9/2005 | Audimoolam et al. | 700/216 |

FOREIGN PATENT DOCUMENTS

| | | |
|---|---|---|
| EP | 0778 535 A2 | 6/1997 |
| WO | 01/06426 | 1/2001 |
| WO | 01/06426 A | 1/2001 |
| WO | 01/98933 A | 12/2001 |

OTHER PUBLICATIONS

EPO Search Report dated Jun. 3, 2005 in GB 0427133.

N. Duque, et al., "IA Planning for Automatic Generation of Customized Virtual Courses," Workshop on "Planning and Scheduling: Bridging Theory to Practice," ECAI 2004.

Henrik Stormer, "Task Scheduling in Agent-Based Workflow," Proceedings of ICSC Symposium on Multi-Agent and Mobile Agents in Virtual Organizations and E-Commerce (MAMA 2000), Wollogong, Australia, Dec. 2000.

C. Valle, et al., "Combining Heuristics in Assembly Sequence Planning", Workshop on "Planning and Scheduling: Bridging Theory to Practice," ECAI 2004.

E. Chantery, et al., "Mission Planning for Autonomous Aerial Vehicles," Workshop on "Planning and Scheduling: Bridging Theory into Practice," ECAI 2004.

Priyang Rathod, et al.,"Interactive Incremental Scheduling for Virtual Telescopes in Education," Proceedings of the Third International NASA Workshop on Planning and Scheduling for Space, Houston, Texas, Oct. 2002.

Charles Plesums, "Introduction to Workflow," Computer Science Corporation, Financial Services Group http//www.wfmc.org/information/introduction_to_workflow02.pdf, 2002.

Business Process Execution Languge for Web Services, Specification, May 2003 (http://www-106.ibm.com/developerworks/library/ws-bpel/).

V. Kumar, "Algorithms for Constraint-Satisfaction Problems: A Survey," AI Magazine, V. 13, N. 1, pp. 32-44, 1992.

S. Fernandez, et al., "Planning Tourist Visits Adapted to User Preferences," Workshop on Planning and Scheduling: Bridging Theory into Practice ECAI 2004.

M. Becker and S. Smith, "Mixed-Initiative Resource Management: The AMC Barrel Allocator," Proceedings of the $5^{th}$ International Conference on AI Planning and Scheduling, Apr. 2000.

L. S. Homen de Mello and A.C. Sanderson, "AND/OR Graph Representation of Assembly Plans," IEEE Transactions on Robotics and Automation, V. 6, N. 2, pp. 188-199, 1990.

M. Papazoglou, et al. "Planning for Requests against Web Services," IEEE Bulletin of the IEEE Computer Society Technical Committed on Data Engineering, 2002.

M. Papazoglou et al., "XSRL: A Request language for Web Services", 2002.

S. Majithia et al, "A Framework for Automated Service Composition in Service-Oriented Architectures", 2004.

Anderson, M., "Workflow Interoperability—Enabling E-Commerce," International Computers Ltd., Jan. 2, 2000.

Database Inspec Online! The Institute of Electrical Engineers, Stevenage, GB: 1997, Tarumi et al: "WorkWeb System Multi-Workflow Management with a Multi-Agent System," XP002330505.

Database Inspec Online! The Institute of Electrical Engineers, Stevenage, GB: 1997, Tarumi et al: "Dynamic Workflow Scheduling with a Multi-Agent System," XP002330506.

"iReserve: powering the responsive enterprise," British Telecommunications plc, 81 Newgate Street, London EC1A 7AJ, UK, 2004.

* cited by examiner

WORKFLOW SCHEDULER

This application is a continuation-in-part of US national phase of international application PCT/GB05/004734 filed 9 Dec. 2005, which designated the U.S. and claims benefit of GB 0427133.4, dated 10 Dec. 2004, and this CIP also claims benefit of GB 06251666.1, filed 28 Mar. 2006, the entire content of each of which is hereby incorporated by reference.

The present invention relates to a workflow scheduler and particularly, but not exclusively, to a workflow scheduling optimiser and related aspects, for scheduling and reservation of resources for complex interdependent actions or events.

The availability of global networks with ready access, for example, using web-based interfaces has lead to a concept termed "netcentricity". This is often characterized by global connectivity, real-time collaboration and rapid and continuous information exchange. It is gaining particular popularity in the service industries, and has been used for applications such as reserving services via the internet in the airline, hotel, theatre, restaurant and vehicle rental industries. The United Kingdom National Health Services (NHS) has recently also rolled out trials of on-line hospital reservation for pre-examinations.

The ability to provide customised services which are locally optimised to suit an individual user's requirements and yet which globally optimise the utilisation of the system resources supporting such customised services for each individual seeking customised services is becoming more and more important commercially.

In particular, whilst many organisations have the ability to provide basic scheduling facilities in an on-line environment, such environments often only offer the customer a very basic scheduling facility. For example, a user may be able to indicate on-line that they would like a service, e.g., a telephone or cable television connection installed on a specific day between 8 am and 1 pm, and the user may have to designate an alternative date and similarly broad timeslot in case the first is not available. However, using known schedulers the user who indicates such requirements, e.g. for Monday morning between 8 am and 1 pm receives no confirmation on-line that such a requested time-slot will be available, nor is the user provided with any means to subsequently narrow down the requested time-slot, should Monday morning be indicated as available, to say, between 10 am and 10.30 am.

The provision of on-line reservation services allows a reduction in costs for operators by allowing customers to complete request forms and make appointments themselves without the operator requiring personnel to carry out these steps. Additionally, it tends to improve customer satisfaction by granting the customer better control over service appointing.

However, this technology has so far only been successfully applied to simple services, in which the service typically contains only a single action which needs a single appointment. For instance, when asked for an appointment for registration, a registry officer can simply look up free slots in an appointment book and offer an appointment in a free slot. But when a service becomes complex, with logical constraints between individual actions, such as workflow for service provision, the operator must manually check the appointability of the workflow, negotiate with the customer on the service appointments over the phone and manually dispatch the job to engineers.

As a result, remotely provisioned, e.g. on-line, scheduling facilities known in the art suffer as the user is not able to interact with the system dynamically and receive confirmation of their request in real-time.

The provision of an ADSL service is an example of such a complex situation. The workflow of ADSL provision typically involves network configuration, frames activity, field activity and customer installation. Due to the complexity, a typical service provision process that is visible to the customer consists of: Day 1: the customer places an order, via call centre or internet; Day 2: the operator acknowledges receiving the order; Day 5: the operator confirms the order and offers standard lead-time dates for installation and activation; Day 10: the broadband installation package is delivered at customer premises; and Day 11: the broadband access is activated. Thus these events or actions have complex interdependencies with some background configuration being achievable in parallel and others only in sequence. For example, broadband access cannot be activated until all the steps before it have been completed. Network configuration may also have interdependencies on equipment availability and so on. Presently, this complexity is hidden from the customer but manifests as an inflexibility and potentially slow process if problems occur in a critical part of the installation workflow.

Another example of a complex process not adequately catered for in the prior art is the provision of private circuits. To build an Ethernet service requires a capacity check at each end of the service. If no capacity exists then planning work will have to be carried out to determine when the access capacity will be available, which could be dependent on a number of things, e.g., Road and Street Act, Road Opening Notices and Wayleaves, etc. This means that it is not possible to just go ahead and book appointments with field workers until this detail is known. The actual work may extend over a period of many tens of days.

As organisations and the service offerings provided become more and more complex, it is increasingly difficult to provide an appropriate comprise between i) providing the customer with the ability to control how a requested task or service is provisioned and ii) optimising the resources of the entity or entities supporting such a request in a global manner. In workflow scheduling systems, a user (e.g. a customer) may request to utilise a resource provided by an entity (e.g., a service provider) without being aware of the impact their request has on the resources available to other users. The scheduler thus must seek to optimise the utilisation of the resources of the system globally for all users, as well as providing locally the optimal workflow solution satisfying the constraints set by the individual user issuing the service request.

Thus, there is a disconnection between the customer and the operator and the progress of the service cannot be constantly monitored and adjusted without human intervention. This is labour intensive and as well as being costly is difficult to perform efficiently, speedily and with high level of customer satisfaction.

Many workflow solutions already known in the art have limitations and/or are otherwise not suited for supporting the type of front-end customer service type solutions (such as web-portals for customer's to request service appointments) which large and complex organisations provide. For example, in the communications industry, many actions which a customer could request would require a number of resources which are provided by different resource providers. The relationship between the actions required to fulfil a request may be quite complex, and is often hierarchical in nature, such that a required temporal sequence between the actions collectively constraints the time-scheduling of a plurality of actions required to fulfil a particular service request (for example, it is necessary to install equipment at a customer's premises before activating connections to the equipment). Similar workflow scheduling complexity is encountered in many other fields, however, and is in no way confined just to the communications industry.

For example, consider a scheme in which end-users of the workflow system submit requests to utilise a resource comprising a telescope with a view to observing particular celestial objects, such as Rathod et al describe in "Interactive, incremental scheduling for Virtual telescopes in Education", proceedings of the 3rd International NASA workshop on Planning and Scheduling for Space, Houston, Tex., October 2002.

Rathod et al describe a system which uses "system initiated rescheduling" to optimise the utilisation of a back-end resource, a time-slot on a telescope, via a portal which provides remote access to the telescope. Each request places a demand for a resource, in this case a request for a time-slot. If the no immediate time-slot is available to accommodate the request, the scheduler seeks to determine if already granted requests can be rescheduled, and if so, contacts each entity whose already granted requests are impacted to see if they are amenable to them being rescheduled. However, in a large organisation in which many resources are made available to service a large number of customer requests, it is simply not practical to ask individual customers to reschedule their requests, due to the resources those individual customers may have already allocated to enable the request to be fulfilled.

Agent-based workflow solutions are also known, such as that proposed by Henrik Stormer, "Task Scheduling in Agent-Based Workflow", in Proceedings of ICSC Symposium on Multi-Agents and Mobile Agents in Virtual Organisations and E-Commerce (MAMA'2000), Woologong, Australia, December 2000. Stormer describes a solution in which a workflow agent maintains the temporal dependency between tasks rather than a fixed, time-bounded schedule. The workflow agent monitors the execution of tasks and dynamically schedules the tasks to be executed. However, such solutions are not appropriate where an end-user has to be provided with a fixed appointment time (say for an on-site visit), as again the user needs to allocate their own resources (for example, they may need to take a day off work, or ensure someone else attends the on-site visit or make other arrangements to provide a visiting engineer with access).

US2002/0156672 discloses an example of a system for creating single, isolated customer appointments; in this case, an appointment with a doctor. The system does not have the capability to deal with complex interdependent actions requiring multiple appointments. US 2001/0037229 is another example of a scheduling system for booking appointments. It also deals with single isolated appointments with no workflow-related interdependencies. It offers only three states for an appointment: namely start, pending or finish.

Similarly, US 2002/0016729 discloses a simple event scheduling system for scheduling events formed as a series of associated tasks which do not have interdependencies.

WO01/06426, describes an automatic work progress tracking and optimising engine for a telecommunications customer care and billing system in which customer orders may be received and entered into the system. Upon the entry of customer orders, the system automatically schedules the orders for completion and optimises the schedule based on several factors. These factors include work force utilisation, customer priority, due date and task dependencies. Furthermore, the system takes into consideration geographical constraints and automatically reschedules and re-optimises the schedule when changes occur due to unforeseen events.

Whilst the system of WO01/06426 can deal with more complex workflows, it is concerned with the enterprise operation domain and not with the customer relationship management domain. The disclosure considers only job scheduling (i.e. allocating technicians to jobs), optimisation and monitoring. It does not consider a full service cycle management spanning appointability check, service reservation, job scheduling, job dispatching, job execution and monitoring requirements. Furthermore, WO 01/06426 is not concerned with enabling customers to constantly monitor the progress of service lifecycle and or to facilitate a consistency check on whether it is possible to take actions, for example, to decide whether a particular appointment may be cancelled, updated, or rescheduled.

Various other workflow solutions are known involving linear scheduling and non-linear scheduling techniques, and their applications span across a variety of application domains. However, the compromise between resource optimisation within the enterprise boundary (i.e., optimising the resources of the service provider) has been largely the focus of such techniques. Accordingly, such solutions are normally less than satisfactory from the perspective of the user, and hence provide low customer satisfaction in the service domain.

Particularly in the field of telecommunications a company must always seek to improve customer satisfaction and retention or suffer from their competitors. Accordingly, it is increasing important to address technical problems which hinder improving customer satisfaction, and it is advantageous if customers are able to optimise workflow scheduling to suit their own requirements and available resources. In particular, it is not desirable to have to ask customers to change their resource allocation for already booked schedules because a subsequent request can only be accommodated if such a change takes place, or if such a re-booking is necessary for the purpose of maximising the utilisation of an enterprise resource.

The invention seeks to mitigate and/or obviate the limitations of known workflow schedulers which impact the enterprise operation domain and customer service domain.

The invention seeks to provide a user of an appointments scheduler according to the invention with greater control over the scheduling process than that provided by known workflow scheduler. The invention also seeks to enable the back-end enterprise resource optimiser to schedule the workflow in a manner suited to optimise the utilisation of the many resources required to fulfil all potential types of customer requests (i.e., the global utilisation of resources).

The invention thus seeks to provide a workflow optimiser derived from an algorithm for scheduling a customer service workflow which operates at a computational complexity of $O(m \times n)$, where m is the number of tasks in the workflow and n is the average number of providers for each service type. The term "task" and "action" will be used to represent an end-point in a workflow; an action is a concept within the context of workflow, whereas a task is assigned to a service provider to fulfil.

This kind of high efficiency makes it possible for the scheduler to achieve fast responsiveness and allow customers to control and configure appropriate scheduling constraints which satisfy their own individual requirements in an on-line environment and to receive a real-time indication of the acceptability of their requests. Thus the invention also seeks to provide a front-end customer service portal enabling users to determine a schedule of a requested work-flow according to their preferences.

A first aspect of the invention relates to an interactive workflow scheduler arranged to enable a user to reconfigure an instantiated workflow for a task comprising a plurality of actions having a predetermined dependency relationship to each other, the scheduler comprising: means to input one or more user-specified constraint conditions into the workflow scheduler; means to regenerate a workflow dependent on said user specified conditions from the instantiated workflow, the regenerated workflow satisfying said one or more user-specified constraint conditions, wherein the scheduler optimises the global utilisation of the resources required to fulfil the user request by processing in parallel the resource requirements of each of said plurality of actions required by the regenerated workflow.

The predetermined dependency relationship of said plurality of actions may comprise a hierarchical relationship. At least one of said one or more user specified constraint conditions may comprise a more narrowly defined condition than a constraint assumed by an instantiated workflow previously presented to the user. The workflow scheduler may regenerate the workflow constrained by a condition comprising one of: a user preference and/or a confirmed appointment and/or a temporal dependency between two or more actions, and/or a back-end resource availability.

The interactive workflow scheduler according to the first aspect of the invention may further comprise: means to aggregate individual scheduled actions in a work-flow into a single appointment whenever a predetermined condition is satisfied. The predetermined condition may comprise the time scheduled for said tasks being less than a predetermined time-duration. The scheduler may be arranged to be iteratively used by the user to fine-tune the user's constraint conditions to conditions which are optimally suited to the user's requirements.

A second aspect of the invention seeks to provide a method of determining the optimal allocation of an available resource to fulfil a user request for a service, the method comprising: at a user interface to a system arranged to enable the user to specify a request; associating the request with one or more user-defined constraints affecting the implementation of the service; generating a hierarchical series of actions based on a framework which is systematically determined to fulfil the user request; and processing the logical dependency, consequence and service enablement for said hierarchical series of actions in parallel to determine the optimal availability of resources to fulfil the user's request and satisfying the given constraints.

A third aspect of the invention seeks to provide an interactive workflow scheduling system enabling a user of an on-line service portal to schedule a request for a service, the portal comprising: a user interface arranged to enable a user to specify a service request; means to enable the request to be associated with one or more user defined constraints; means to systematically determine a plurality of actions which are required to fulfil the user service request; means to systematically determine the relationship between the series of actions generated to define a framework between the actions in dependence on said one—or more user defined constraints; and means to determine in parallel how each action should be assigned available resources to fulfil the user request.

The system may assign each action to available resources in parallel propagating along the required sequence of actions in a given framework of actions to fulfil the user request. The relationship between the series of actions may define a hierarchy of actions.

A fourth aspect of the invention seeks to provide a service portal provided by a communications network enabling a user to remotely specify a service request, the service portal being arranged to support a system according to the third aspect of the invention.

A fifth aspect of the invention seeks to provide a computer program arranged to implement steps in a method according to the fourth aspect.

A sixth aspect of the invention seeks to provide an interactive workflow schedule optimiser arranged to enable a user to perform an optimisation process by iteratively reconfigure an instantiated workflow for a task comprising a plurality of actions having a predetermined dependency relationship to each other, the schedule optimiser comprising: means for a user to input one or more user-specified constraint conditions into the workflow scheduler with each iteration of the optimisation process; means to regenerate in each iteration of the optimisation process, a workflow dependent on user specified condition from the instantiated workflow, the regenerated workflow satisfying said one or more user-specified constraint conditions, wherein the scheduler optimiser optimises the global utilisation of the resources required to fulfil the user request in each iteration by processing in parallel the resource requirements of each of said plurality of actions required by the regenerated workflow for that iteration of the optimisation process.

A seventh aspect of the invention relates to a method of optimising an interactive workflow scheduler by iteratively reconfiguring an instantiated workflow for a task comprising a plurality of actions having a predetermined dependency relationship to each other, the method comprising: inputting one or more user-specified constraint conditions into the workflow scheduler with each iteration of the optimisation process; generating in each iteration of the optimisation process, a workflow dependent on user specified condition from the instantiated workflow, the generated workflow satisfying said one or more user-specified constraint conditions, wherein in each iteration, the global utilisation of the resources required to fulfil the user request is optimised by processing in parallel the resource requirements of each of said plurality of actions required by the regenerated workflow for that iteration of the optimisation process.

An eighth aspect of the invention relates to a control system for an interactive workflow scheduler, the control system comprising: configuration means to iteratively configure an instantiated workflow for a task comprising a plurality of actions having a predetermined dependency relationship to each other, said configuration means including: means to input one or more user-specified constraint conditions into the workflow scheduler with each iteration of the optimisation process; and means to generate in each iteration of the optimisation process, a workflow dependent on user specified condition from the instantiated workflow, the generated workflow satisfying said one or more user-specified constraint conditions, wherein in each iteration, the global utilisation of the resources required to fulfil the user request is optimised by processing in parallel the resource requirements of each of said plurality of actions required by the regenerated workflow for that iteration of the optimisation process.

In a ninth aspect, the invention provides a real-time reservation system comprising a reservation portal, a workflow library, and an appointable workflow generator, the reservation portal being arranged to receive user input identifying a service request and constraint data which defines user constraints on the making of appointments, the workflow library containing a plurality of workflow templates each comprising a plurality of at least partially interdependent actions and each being mapped to a predetermined service request, the appointable workflow generator being arranged to receive the constraint data from the reservation portal and to process a workflow template to generate an appointable workflow comprising a set of appointable actions, taking account of the constraint data, and the interdependencies between actions in the workflow template, whereby the reservation system is able to generate multiple appointments for actions having complex interdependencies.

This invention proposes a new service infrastructure framework into which the relevant enterprise components can be easily plugged. This enables a seamless integration of respective components in a coherent way, bringing a better interaction between the customer and enterprise system, as well as the transparency of the enterprise. Furthermore, this proposed approach embeds a set of rules that operate on states across disparate components to determine whether taking certain actions, such as service appointments update or cancellation is allowed.

The invention also permits the checking of the appointability of workflow and finding of an appointable workflow portion during the execution of the workflow.

In a tenth aspect, the invention provides a method of reserving resource comprising receiving user input identifying a service request, receiving user constraint data which defines user constraints on the making of appointments, obtaining a workflow template comprising a plurality of at least partially interdependent actions associated with the service request, and processing the workflow template to generate an appointable workflow comprising a set of appointable actions, taking account of the constraint data, and the interdependencies between actions in the workflow template, whereby the reservation system is able to generate multiple appointments for actions having complex interdependencies.

In further aspects, the invention provides a reservation portal as defined in claim 14 below, an appointable workflow engine as defined in claim 15 below, a computer readable medium as defined in claim 16 below and a compute program as defined in claim 17 below.

Each of the above aspects of the invention may be suitably combined with each other and/or any suitable dependent features as indicated above, where such combination is apparent to those skilled in the art.

The invention thus enables the customer service domain function to be moved out of the enterprise boundary. The customer service portal provided by the invention allows the customer to control the service they receive, effectively to self-service their requests, by their real-time interactions with the portal. The invention provides a customer service portal which provides customers with the ability to make repeated requests. This enables a user to effectively play with the scheduler by entering various conditions and constraints related to their request(s) until they receive real-time confirmation on the viability of their requests which the user considers to satisfactory regarding their requirements. This real-time ability for the user to control the workflow system until an optimal compromise is achieved between their individual customer requirements and the enterprise resource availability is highly advantageous. It enables the enterprise to fulfil the customer's individual requirements in a way which globally optimises the resource utilisation of the enterprise for all their customers yet provides individual customer satisfaction. In some embodiments, the customer or enterprise can offer a broad, provisional schedule, and confirm availability in real-time, before the customer fine-tunes the offered schedule to their own requirements. In other embodiments, where the customer is able to fine-tune the scheduling process in real-time until a mutually satisfactory schedule is achieve both for the service provider and the customer, even greater customer satisfaction can achieved.

Embodiments of the invention will now be described with reference to the accompanying drawings which are by way of example only and in which:

FIGS. 3A to 3J show screen shots of a portal according to FIG. 1 of the accompanying drawings;

Figure 1:
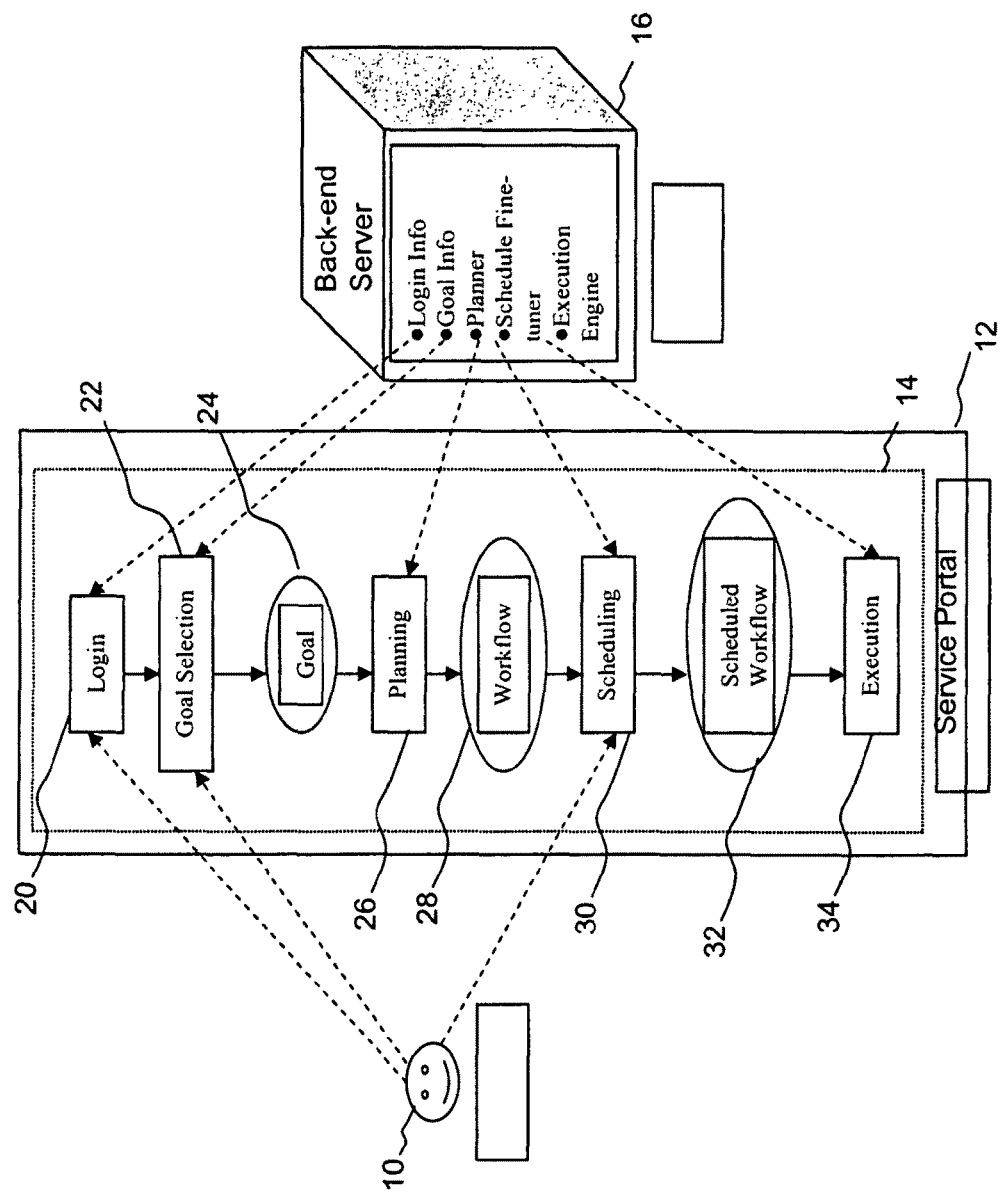
FIG. 1 shows schematically an on-line customer service portal according to an embodiment of the invention.

The embodiment comprising the best mode of the invention currently contemplated by the inventors will now be described together with other embodiments. Those skilled in the art will appreciate that the embodiments described are greatly simplified for clarity and whilst an enabling description of the invention is provided, where it is apparent to those skilled in the art that certain components/steps are implicitly necessary for implementing the invention, such components/steps may not be fully or explicitly described in the following detailed description.

The invention relates to an interactive workflow scheduler and related aspects. The term workflow is defined herein to mean the set of relationships between all the activities in a project (a project may be one or more task or task(s) associated with fulfilling a request), from start to finish. Activities are related by different types of trigger relation. Activities may be triggered by external events or by other activities. To overcome the above-mentioned problems, some aspects of the invention cover a service reservation and monitoring common infrastructure that covers the following areas:

Firstly, it goes beyond the scheduling and execution domain of WO 01/06426 and addresses the full life cycle of service reservation, which includes appointability check (can an appointment be made), service reservation, job scheduling, job dispatching, job execution and job monitoring. This is made particularly simple by providing a common infrastructure with which different functional modules can be associated. The benefit of this infrastructure lies in its capability of seamlessly linking disparate functional modules and system resources together to achieve a higher degree of service reservation automation as well as keeping customers informed of the service status with least effort. The well-defined common interface also makes it possible to select and use the most suitable functional components in the system for particular applications.

Secondly, the infrastructure proposes a new concept of reserving on resource capacity rather than individual technicians. Reserving on resource capacity provides a more robust reservation scheme and lowers the risk of breaking service commitments to customers. This is because the scheduler can always try to allocate an individual technician at a later stage in the workflow process.

Thirdly, the infrastructure includes a ruleset that can operate on the states of the individual functional components. The purpose of the ruleset is to help determine whether some of the customers' actions can be taken. For instance, the system can check whether a service action is appointable, whether an action is reservable, whether an action is schedulable, whether an action is dispatchable, whether an action is executable, etc.

The workflow schedule is interactive in that a user of the workflow schedule system is able to control the configuration. The user receives confirmation in real-time that their request, i.e., the requested configuration of the scheduler, is acceptable. The workflow scheduler optimises by enabling a user to be allocated a scheduling solution which satisfies one or more constraint condition(s) which the user has set. A constraint condition may constrain an individual action, or the start and/or end-time of a sequence of actions (including those of an entire task). In addition, the workflow scheduler is able to provide an iterative facility should the user so require, e.g. by enabling the user to fine tune a given scheduling solution to a solution which satisfies even more tightly constrained conditions than those used to obtain an initial scheduling solution (which may or may not have been generated from conditions provided by the user).

In this way a workflow scheduler is provided in which the schedule of a workflow generated in response to a user generating a request for a particular offering (e.g., service/product offering) suits the user's individual needs (i.e., is locally optimised) yet the offered solution also satisfies the requirements of the offering enterprise in that it globally maximises the utilisation of the relevant enterprises' resources required to fulfil the user's request.

FIG. 1 of the accompanying drawings illustrates an embodiment of the invention in which a user 10 (for example, a customer) interacts via a service portal 12 (for example a customer service portal) with a back-end server 16. The back-end server 16 provides login information, goal information, a planner, a schedule optimiser (indicated as a schedule "fine-tuner" in FIG. 1), and a workflow execution engine. The back-end server 16 is thus capable of supporting the allocation of one or more enterprise resources to fulfil a request issued by the user 10 via the service portal 12.

As shown in FIG. 1, the service portal 12 includes control system 14 comprising a workflow scheduler which enables the user to indicate when the user's preferences for how the request is to be serviced. The term schedule optimiser and workflow scheduler are used herein to indicate a means of scheduling a series of actions to fulfil one or more tasks which must be satisfied to meet a customer request. The schedule optimiser extends the capabilities of the workflow scheduler in that it provides an iterative scheduling process enabling a user to iteratively interact with the workflow scheduler until a workflow solution which the user considers to optimally meet their requirements is determined in real-time. Effectively the schedule optimiser enables the user to "fine-tune" their scheduling requirements.

The functional structure of the control system 14 provided by service portal 12 is shown as a flow chart in FIG. 1. The features shown in FIG. 1 enable the user 10 to interact with the service portal 12 in such a way that a method of optimising a workflow schedule is implemented.

The control flow chart links with both the user 10 at the front-end and the server 16 at back-end, the term "back-end" indicating the functionality to be provided by the enterprise domain. At the very beginning, the user 10 will log into the service portal 12 by supplying with his/her login information (step 20); the "Login" function module will look up, in the back-end server 16, the login information database to verify the user 10.

A successful user verification enables the control system 14 to proceed to select a goal (step 22) from a list of pre-defined goals supplied by the back-end server 16. The selected goal 24 is then fed into the "Planning" module 26 where the "Planner" at the back-end server 16 is triggered to generate a workflow to achieve this goal (step 28). At this stage, the workflow is abstract only where the end-points in the workflow are task types rather than concrete service providers who can physically fulfil the tasks. The abstract workflow is then fed into a "Scheduling" module (step 30) that takes inputs from both the user at the front-end and the "scheduler" or "schedule optimiser" (e.g., the schedule fine-tuner) at the back-end server 16 to generate a "scheduled workflow" as output (step 32). The scheduled workflow is a "provisioned" workflow where the endpoints of the workflow are connected with concrete service providers who are able to do the jobs within the required time window.

The scheduled workflow is then fed into "Execution" module 34 that triggers the "Execution Engine" at the back-end server to physically execute this workflow.

A workflow can operate only behind the enterprise boundary where the customer can only directly interact with the system at the "login" and "goal selection" stages, in which case, once the customer submits his/her request, he/she will lose control over the rest of the workflow and be at the mercy of the operator. The invention enables a user to interact with the workflow directly even after the user has submitted an initial request and thus gives the user a high degree of control of his/her requirement, as the user can reiterate their request one or more times until a workflow solution is found which satisfies the user's requirements.

The optimisation system of the workflow scheduler requires the workflow to enable different modular functions (for example, "order PSTN", "on-line payment", "provision PSTN", "install land phone line", "check customer satisfaction") to be joined. Any workflow description language can be used to describe the workflow, providing it provides constructs in the language such as:

Variable Definition: a variable is a container of business information such as customer name, credit information, payment, etc.; the value of a variable is normally mapped to one of the specific types such as Boolean, integer, double and string.

Expressions: four kinds of expressions are provided namely, arithmetic expression, comparison expression, logical expression and timing expression. The first three kinds of expressions are the same as those can be found in common programming languages; they are normally used to construct the control information in the control flow constructs. The timing expression is used to specify and evaluate timing information, such as the duration of a time window, before or after an absolute time; they are normally used to specify the scheduling information of workflow.

Control Flows: four kinds of flow constructs are also available for building the (nested) branches of workflow; these include sequential flow, parallel flow, switch and loop. A sequential flow construct is used to build workflow blocks where each block has to be executed one by one. A parallel flow construct is used to build workflow blocks where all the blocks can be executed in parallel. A switch construct is used to build branches of blocks where only one of the branches can be executed based upon the evaluation result of the condition at each branch. A loop construct is used to build a loop of execution of particular block with a logical expression specifying the exit condition.

Action: an action is at the end-point of a workflow; it can be regarded as a representative that connects to an internal/external (web) service. An action takes a list of parameters as input and another list of parameter as output. The input parameters are some of the variables defined by the workflow that are sent to the internal/external service for processing; the returned values from the internal/external service will be stored in the variables specified by the output parameters.

Assignment: the semantics of assignment is the same as that can be found in common programming languages. It is used to move business information around in the internal buffer of the workflow engine. It can also store intermediate information to a variable that is the result from an evaluated expression.

Exception handling: as in many business or engineering application, an exception is unavoidable; the exception handling construct can specify which action to take when an exception occurs in an internal/external service. For instance, if one service provider fails, the exception handling mechanism can choose another available service provider to do the job.

The workflow may further require a visibility construct. A visibility construct has been identified to be useful for workflow, especially in the customer service domain, as it enables the confidential level of workflow blocks to be specified so that some confidential workflow blocks may be only visible within enterprise boundary, i.e., not visible to the customer.

The workflow execution engine according to one embodiment of the invention runs any workflow program written in an appropriate language. Preferably, the workflow execution engine is written in Java so that a kind of portability across platform can be maintained. In one embodiment of the invention, the workflow is written in XML format that is parsed by a parser to generate a runtime Java model. In either of these embodiments, the runtime model is then passed to the workflow execution engine which then interprets and executes it. During the execution process, the workflow execution engine will contact with internal/external (web) service when and if needed. The co-ordination of internal/external services is controlled by the logic embedded in the workflow itself.

Figure 2:
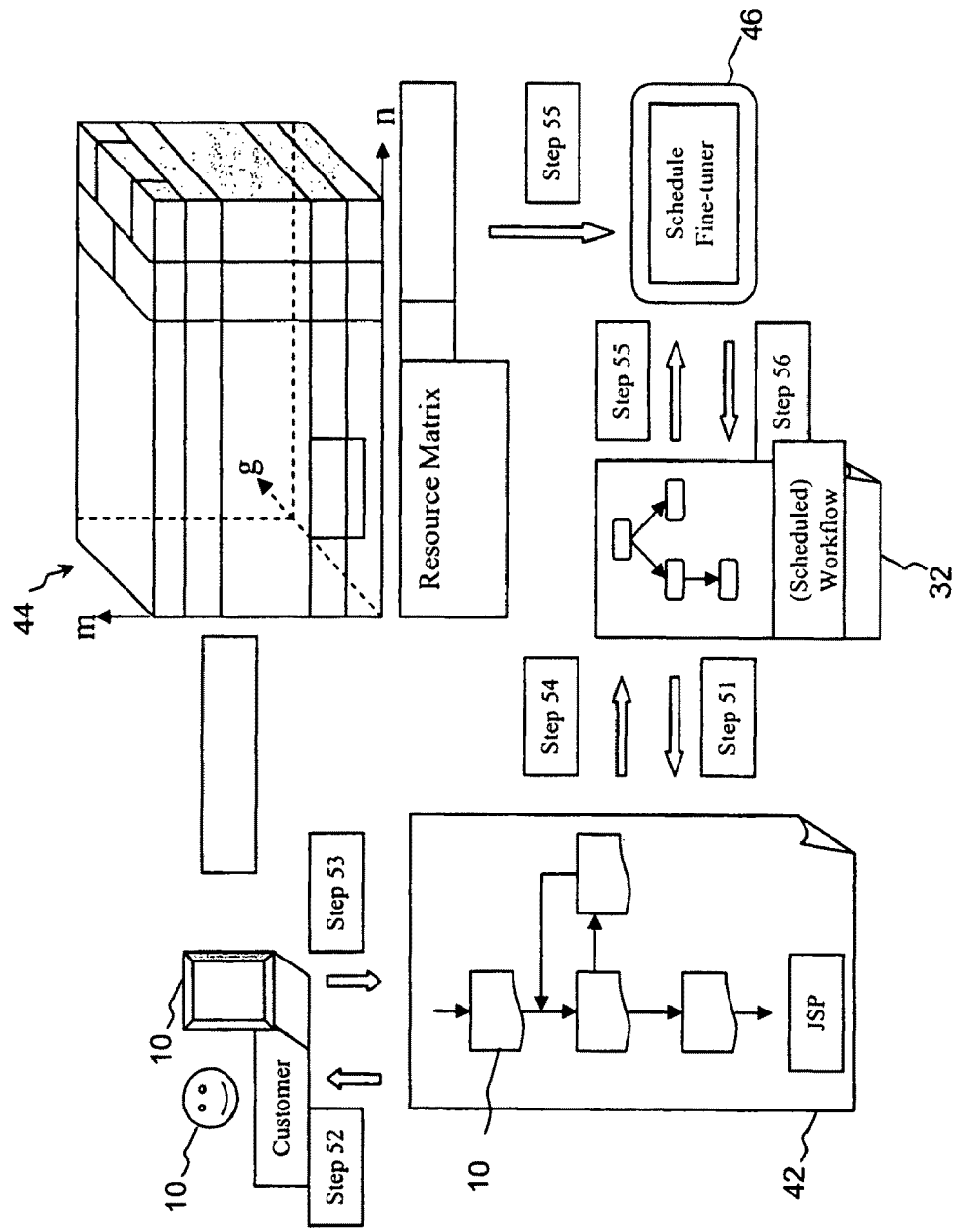
FIG. 2 shows schematically the architecture of an embodiment of the invention.

Referring now to FIG. 2 of the accompanying drawings more detail of the scheduling function module 30 shown in FIG. 1 is shown. In FIG. 2, a workflow scheduler is provided by the service portal, which comprises a graphical user interface (GUI) at customer service front-end and schedule algorithm at the back-end server.

The scheduling function module 30 shown schematically in FIG. 1 is arranged to interact with four other components of the system. Firstly, a workflow 28 is provided as input to the scheduling module 30. Secondly, there is the user who seeks to optimise (i.e., fine-tune) a workflow schedule. Thirdly, there is the scheduler (which may comprise a schedule optimiser) that physically performs the scheduling function and, finally, a scheduled workflow 32 that is generated as output.

In FIG. 2, a user 10 interacts via the customer service portal through appropriate communications means, for example, via a computer keyboard and monitor. A JSP engine 42 supports a flow of Java Servlet Pages (JSP) 40 which are dynamically generated based on certain templates and displayed in the computer monitor. The user can interact with the JSP flow by click links/buttons in it or by providing input.

Also shown in FIG. 2, is a three-dimension resource matrix 44 that stores the runtime resource information. In the embodiment shown, the first dimension (n in FIG. 2) specifies all the service types available in the system, the second dimension (m in FIG. 2) contains all the available service providers for a specific service type; the third dimension ("g") lists all the available time-slots for a specific service provider.

Also shown in FIG. 2 is a (scheduled) workflow 32 (see FIG. 1) that is written in a workflow descriptive language supporting the features described hereinabove as well as a schedule optimiser 46 (denoted as a schedule fine-tuner in FIG. 2). The schedule optimiser takes the workflow 32 (and any constraint(s)) together with the resource matrix 44 as input and generates as output a new scheduled workflow 32.

The information flow of the workflow optimising system 40 will now be described as follows.

A workflow 32 with initial timing constraint is fed into the system (Step 51). The workflow is inputted into the JSP engine 42. The JSP engine 42 dynamically transforms the workflow input into a series of web pages that can be displayed in the computer monitor (Step 52). The user 10 has a look at the initial workflow schedule 32 and can change or locally optimise (e.g. fine-tune) the schedule 32 through the web pages according to the user's preference (Step 53). The JSP engine 42 picks up the user input as new schedule constraints and records them in the workflow (Step 54). The schedule optimiser 46 is then triggered to take the workflow (and new schedule constraints) 32 and resource matrix 44 as input and works out a new schedule for the workflow (if it is feasible); the new schedule will be recorded in the workflow (Step 56).

The updated workflow schedule 32 will be fed into the JSP engine so that the process can be iterated and step 51 can start again. This kind of loop will terminate when the end-user 10 is happy with workflow schedule 32 and decides to proceed with the execution of the workflow.

The scheduling process can be regarded as a constraint satisfaction problem and traditional constraint satisfaction algorithms operate by exhaustively searching over the problem space and picking up the solutions that meet the selection criteria.

If the problem is NP-complete, the algorithms will normally incur a computational complexity of $O(M^n)$—where n is the number of actions and M is the average number of providers for each service. An NP-Complete decision problem falls within the subset of nondeterminisitic polynomial time problems for which it is very unlikely that there exists a polynomial algorithm. An algorithm is said to be solvable in polynomial time if the number of steps required to complete the algorithm for a given input is $O(n^k)$ for some nonnegative integer k, where n is the complexity of the input.

The invention assumes that firstly, the scheduled services will never be changed, unless the user wants to initiate the changes, and secondly the scheduler will always find the earliest time slots that can satisfy the customer's requirement (i.e., the scheduler operates on a first-come, first served principle).

The scheduling algorithm has a computational complexity of $O(m \times n)$, where n and m have the definitions given above, and before it can be more formally described, the workflow language used will be described in more detail. As mentioned hereinabove, the workflow language is composed of a variety of program constructs for describing variable, expressions, control flows, actions, assignments and exception handling. For scheduling purposes, however, only the control flows and actions are required. The Backus Naur Form (BNF) meta-symbol notation will be used to formally describe the workflow language syntax, in which the meta-symbol notation ::=means "is defined as", | means "or", and < > angle brackets surround category names. The angle brackets distinguish syntax rules names (also called non-terminal symbols) from terminal symbols which are written exactly as they are to be represented. A BNF rule defining a nonterminal has the form: nonterminal ::=sequence_of_alternatives consisting of strings of terminals or nonterminals separated by the meta-symbol |.

The BNF of the relevant control flow and action program constructs are therefore:

```
Workflow          ::=   Statement
Statement         ::=   SequentStatement
                      | ParallelStatement
                      | SwitchStatement
                      | Action
SequentStatement  ::=   Statement
                      | Statement SequentStatement
ParallelStatement ::=   Statement
                      | Statement ParallelStatement
SwitchStatement   ::=   SwitchCases
SwitchCases       ::=   SwitchCase
                      | SwitchCase SwitchCases
SwitchCase        ::=   Condition Statement
Action            ::=   ServiceType, (note that ServiceType ::= String)
```

The Condition BNF is not essential to the scheduling module of the invention. It is equivalent to a logical expression in that the evaluation of Condition can only be done at run time rather than at scheduling time, because the value of the variable is only available at run time. As a result, at the scheduling stage, it is assumed that all paths in the business process are to be executed and the workflow is scheduled with this assumption. For instance, if a program construct has multiple branches, we assume that the duration of this construct is the longest among all these branches. It is in this sense that the evaluation of condition is not important at scheduling stage.

Let constrainedStart be the initial schedule constraint after which the user wishes the job to start; constrainedEnd be the initial schedule constraint before which the user wishes the job to finish; scheduledEnd be the finishing time of the scheduled workflow. Let Sch( ) be function of scheduling. One embodiment of a scheduling algorithm is as set out below:
Algorithm: Workflow Scheduling.
Input: workflow, constrainedStart, constraintEnd.
Output: scheduledWorkflow.
Step 1. Compute the finishing time of the workflow schedule. This can be achieved by calling Sch(workflow, constrainedStart, scheduledEnd), where workflow and constrainedStart are the inputs and scheduledEnd is the output. The following bullet points describe the semantics of these program constructs and how they work together to fulfil the function.

Step 2: Check whether the finishing time meets the deadline.

```
if (Before(scheduledEnd, constrainedEnd)){
    Schedule is successful AND "scheduled workflow" = (workflow +
    scheduledResources).
} else {
    Schedule fails.
}
```

It can be seen from the above that the algorithm operates by first computing the finishing time of the scheduled workflow and comparing it with the constrained finishing time of user requirement; if the former finishes before the latter than the scheduling task is successful; otherwise it fails. In Step 1, the computation of scheduledEnd and the scheduling of actions are carried out in a recursive way, by following the semantics definition of each program construct.

For example, considering the first bullet point above, its semantics can be interpreted as: in order to schedule "workflow", given the inputs of "workflow" and "constrainedStart", we need to first schedule "statement", the inputs of which are "statement" and "constrainedStart". The "statement" is the one used in the BNF of "workflow", and the "constrainedStart" is the same as the "constrainedStart" in "workflow". After scheduling, "scheduledEnd" will be returned as the output, which can be further returned as the "scheduledEnd" of workflow scheduling.

The semantics of the scheduling action will now be described in more detail.

Let M be a resource matrix, M={$STi$, $1<=i<=nst$}, where $STi$ is a service type and nst is the total number of service types. Let SPS($STi$)={$SPj$, $1<=j<=nsp(STi)$} be a set of service providers associated with the service type $STi$, where $SPj$ is a service provider and $nsp(STi)$ is the total number of service providers associated with Service Type $STi$.

Let SLS($SPk$)={$SLm$, $1<=m<=nsl(SPk)$} be a set of available time slots for service provider $SPk$, where $SLm$ is an available time slot and $nsl(SPk)$ is the total number of associated service provider $SPk$. Let $SLm$=($SLSm$, $SLEm$), where $SLSm$ be the starting time of Slot $SLm$ and $SLEm$ be the end time of $SLm$.

```
Sch(workflow, constrainedStart, scheduledEnd) -> Sch(statement, constrainedStart,
    scheduledEnd).
Sch(statement, constrainedStart, scheduledEnd) ->
        switch(statement){
            case "sequentStatement": Sch(sequentStatement, constrainedStart,
scheduledEnd); break;
            case "parallelStatement": Sch(parallelStatement,  constrainedStart,
scheduledEnd); break;
            case "switchStatement": Sch(switchStatement,  constrainedStart,
scheduledEnd); break;
            case "action": Sch(action, constrainedStart, scheduledEnd); break;
        }
Sch(sequentStatement, constrainedStart, scheduledEnd) -> Sch(statement, constrainedStart,
    scheduledEnd1), Sch(sequentStatement, scheduledEnd1, scheduledEnd).
Sch(parallelStatement, constrainedStart, scheduledEnd) -> Sch(statement, constrainedStart,
    scheduledEnd1),    Sch(parallelStatement,    constrainedStart,    scheduledEnd2),
    scheduledEnd=Latest(scheduledEnd1, scheduledEnd2).
Sch(switchStatement, constrainedStart, scheduled End) -> Sch(switchCases, constrainedStart,
    scheduledEnd).
Sch(switchCases,  constrainedStart,  scheduledEnd)  ->  Sch(switchCase,  constrainedStart,
    scheduledEnd1),     Sch(switchCases,     constrainedStart,     scheduledEnd2),
    scheduledEnd=Latest(scheduledEnd1, scheduledEnd2).
Sch(switchCase,  constrainedStart,  scheduledEnd)  ->  Sch(statement,  constrainedStart,
    scheduledEnd).
Sch(action, constrainedStart, scheduledEnd) ->To be refined.
```

Let TW(SPk) be the time window for service proivder SPk; the time window is the operational time length for SPk to complete the action.

Let A be an action, CS be constrained starting time of A, SE be scheduled end time for A, CONFIRMED be a boolean variable indicating whether A has got a schedule that is confirmed, CSS and CSE be the start time and finish time of the confirmed schedule, respectively.

The problem of scheduling A is to find a time slot SLm, among the resource matrix, where the timing constraint of A can be satisfied. This can be described in pseudocode as:

```
Sch(action, CS, SE) ->
   if(CONFIRMED){
      if(before(CSS, CS)){
         ScheduleFails.
      }
      SE=CSS.
   } else {
      ST=ServiceType(action),
      SPk=GetServiceProvider(ST),
      SLm=GetTimeSlot(SPk),
      SLSm=getStartTime(SLm),
      SLEm=getEndTime(SLm),
      if(before(SLSm, CS)){
         SlotFails.
      } else {
         SE=CS+TW(SPk).
      }
   }
```

Since there is a two-dimensional (service providers and time slots) matrix for each service type, the search of proper time slot that suits for a given action will be conducted in this matrix space. If a time slot can satisfy an action, the slot is recorded and a finish time for this action is computed and recorded. If the time slot could not satisfy the action, a "Slot-Fails" error will be generated and the search goes to the next time slot in the same service type space. If there is a conflict between the constrained start time and the confirmed start time, then a "ScheduleFails" error will be generated and the workflow schedule fails instantly.

The scheduling of workflow according to the invention is thus a combination issue, as all the actions need to be searched, in the respective service type space, for a satisfied time slot. Once there exists a selection of time slots that can satisfy the actions' constraint (that is, the confirmed schedules) and initial scheduling constraint, this selection can be accepted as a schedule; otherwise, it is concluded that there is no workflow schedule can be generated.

Figure 3A:
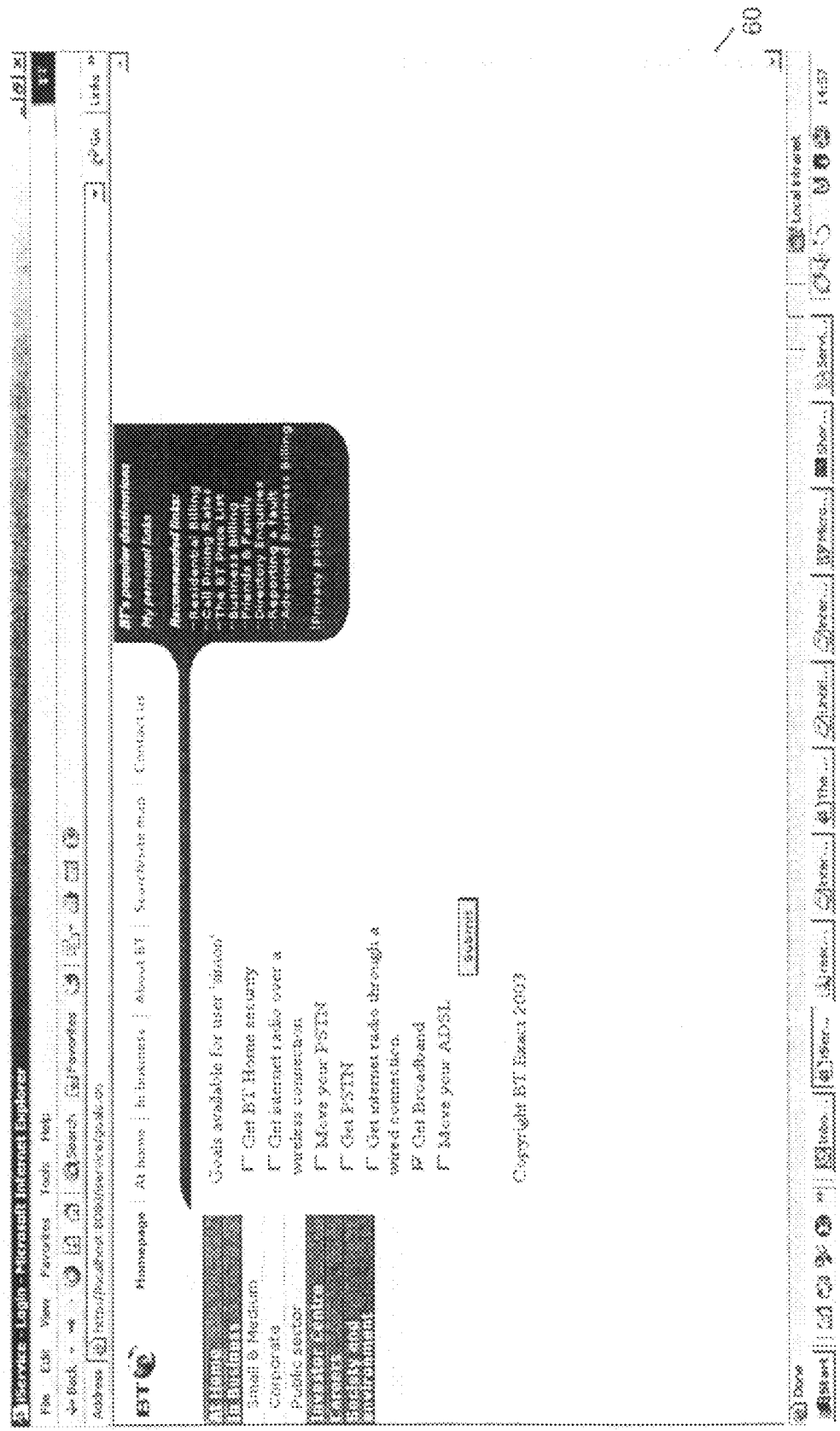

In one embodiment of the invention, the scheduler comprises a schedule optimiser which includes a schedule optimising algorithm, referred herein as a "fine-tuner algorithm". A customer service portal provides users with a portal to access the schedule optimiser, e.g., it allows customers to place their order on-line via a web browser and to control how their order is scheduled. In this specific embodiment, the available services that can be ordered include "Get Home Security", "Get Broadband", etc. After the customer logs into the portal, he can then select one of the goals shown in FIG. 3A, such as "Get Broadband".

Figure 3B:
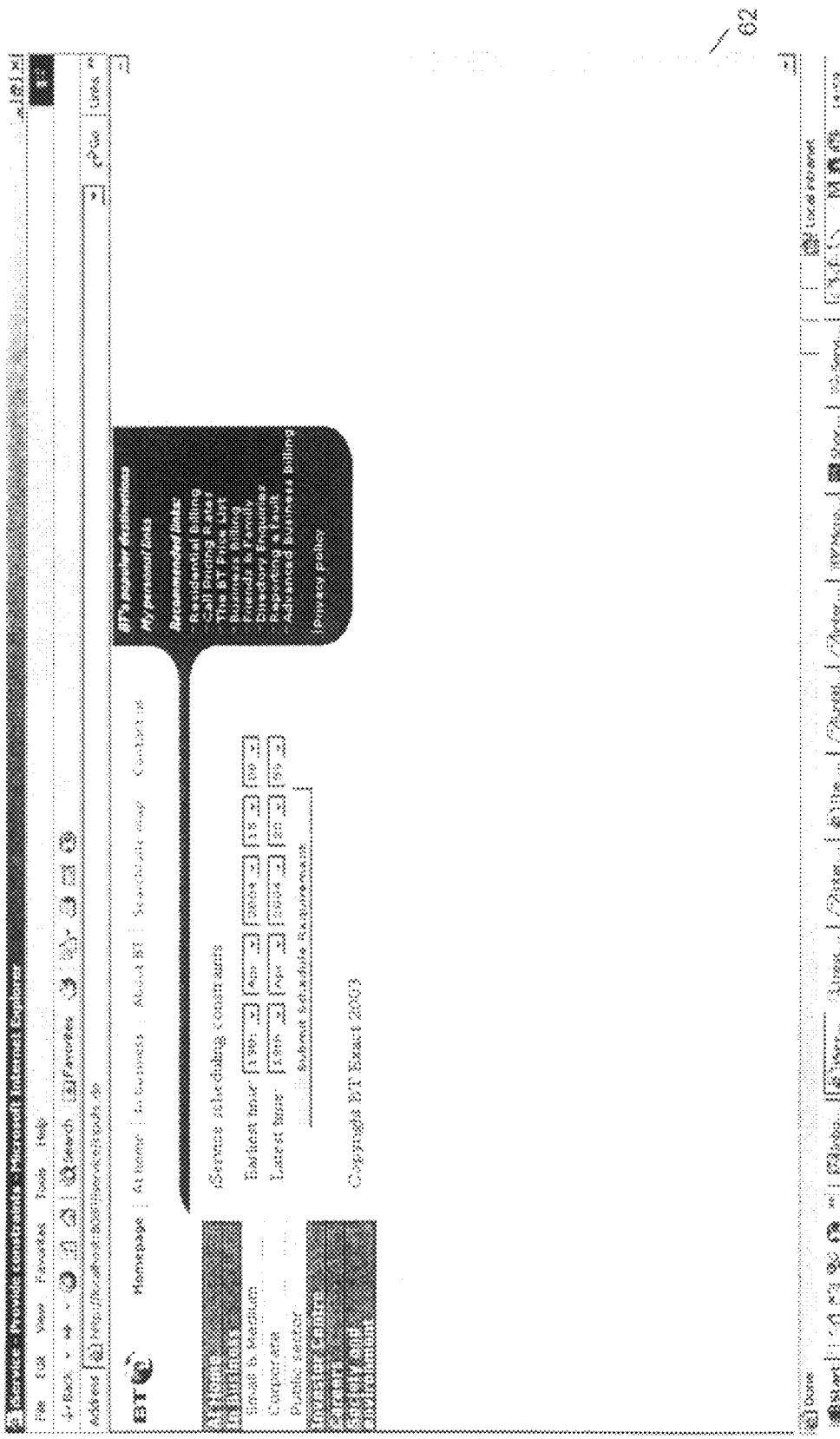

The customer can then input the overall timing constraint in FIG. 3B, by specifying the preferred start date and time and the preferred end date and time. Having obtained this information, the customer service portal engine first produce a workflow for handling this request and an initial schedule for each action in the workflow, that can be seen in FIG. 3C.

Figure 3C:
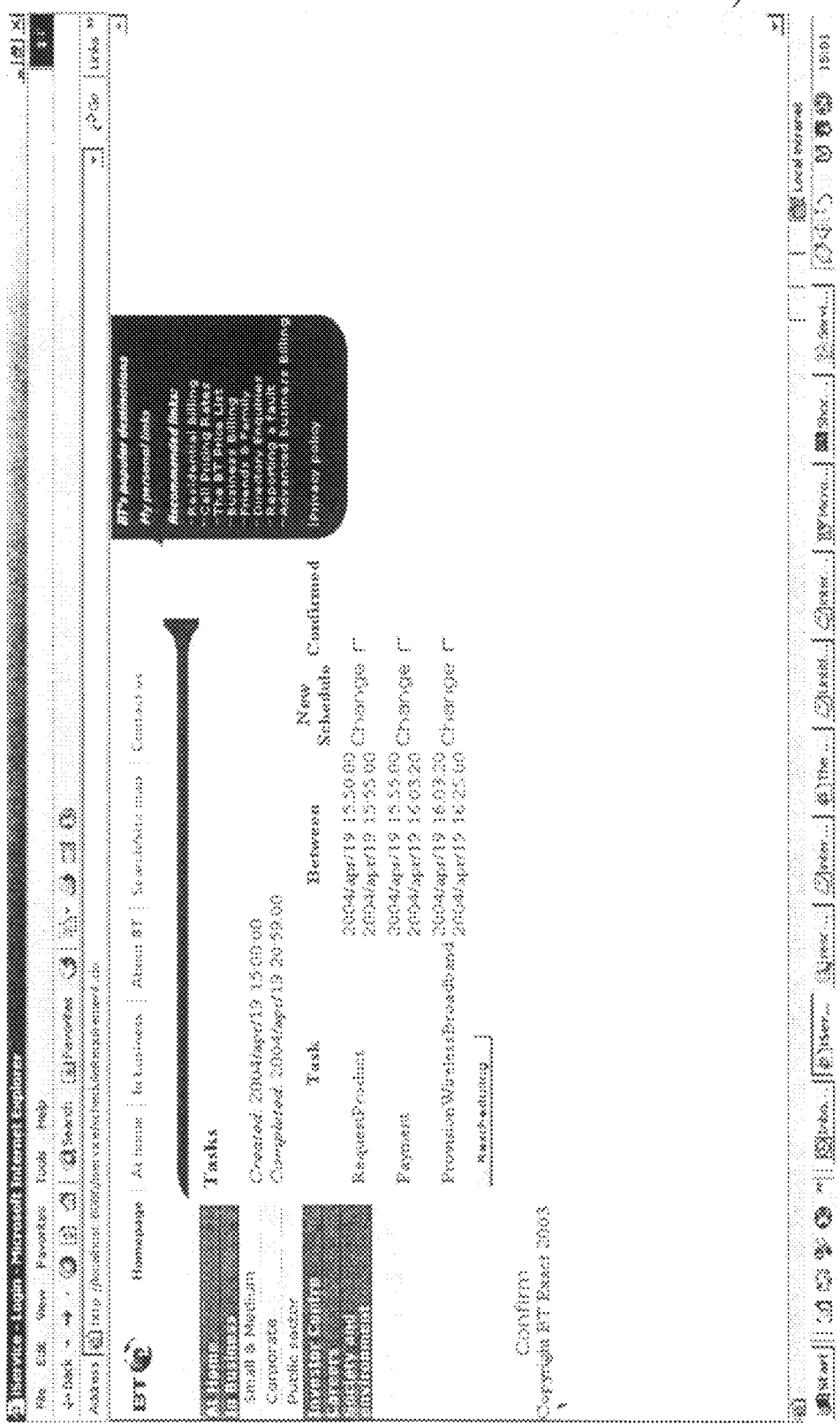

In FIG. 3C, a workflow is generated for this request that is composed of three actions: "RequestProduct", "Payment" and "ProvisionWirelessBroadband". "RequestProduct" is an action where the customer's requirement is elicited and linked to the right product that can be provided. "Payment" is an action where all the bills for the product are sorted out; the bills not only includes the bill for product itself, but also includes the bills for insurance, delivery fees, etc. The "ProvisionWirelessBroadband" is an action where a service engineer can go to the customer's premise and physically install the wireless broadband. There exists a linear dependency among the three actions, where "Payment" has to follow "RequestProduct" and "ProvisionWirelessBroadband" follows "Payment". The initial schedule for each action are (15:50:00-15:55:00), (15:55:00-16:03:20) and (16:03:00-16:25:00), respectively, all during the same day of the 19 Apr. 2004. The schedule is generated based on the availability of service providers.

Figure 3D:
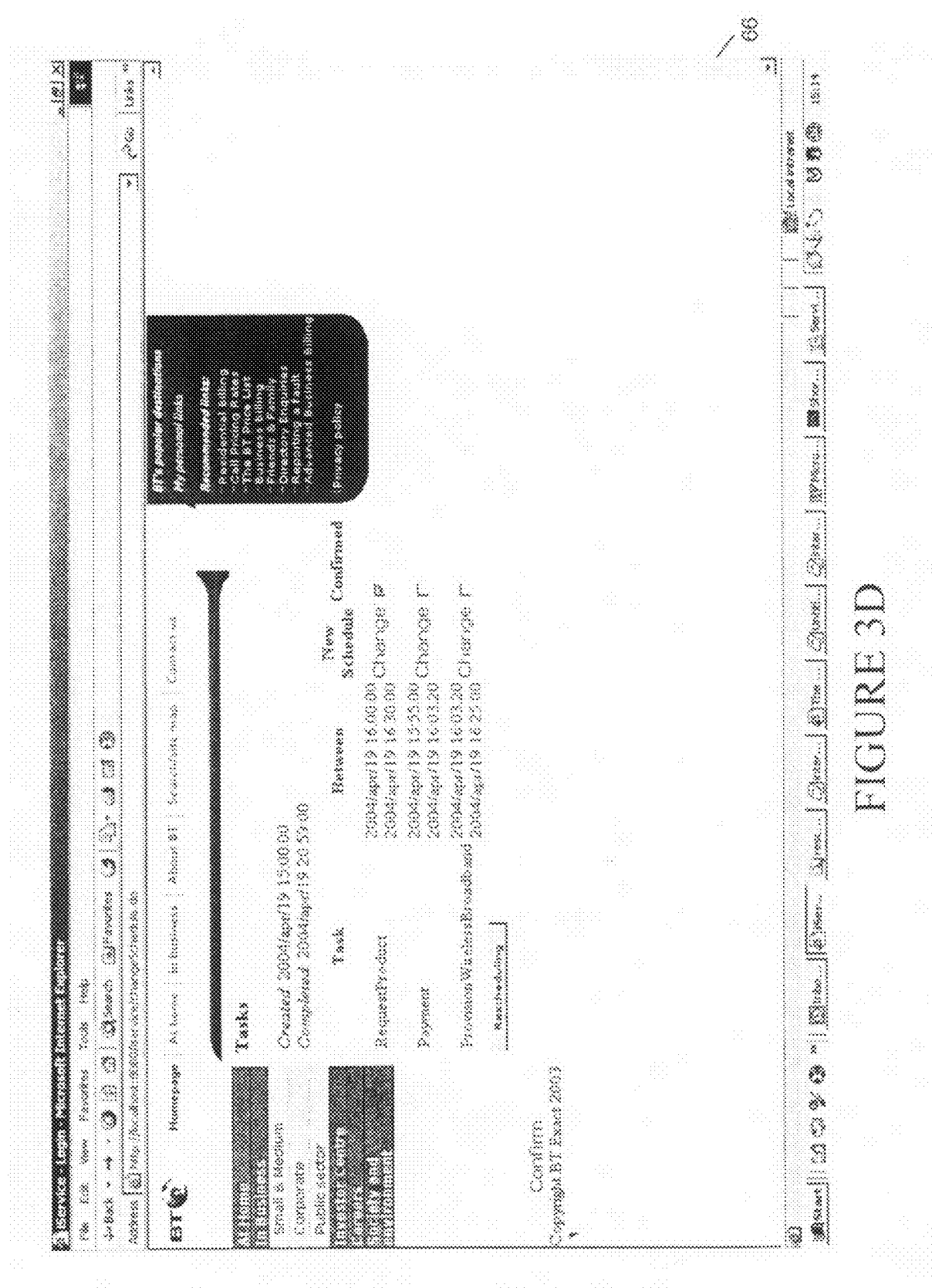

The customer is not happy with the schedule of "requestProduct" and wants to change it to another schedule. By clicking the "change" button in the row of requestProduct, the customer is directed to a schedule-change page, where he is able to update this schedule to his preference, in this case, 16:00-16:30. He is then directed back to the schedule fine-tuning page, as shown in FIG. 3D, where changes can be seen.

Figure 3E:
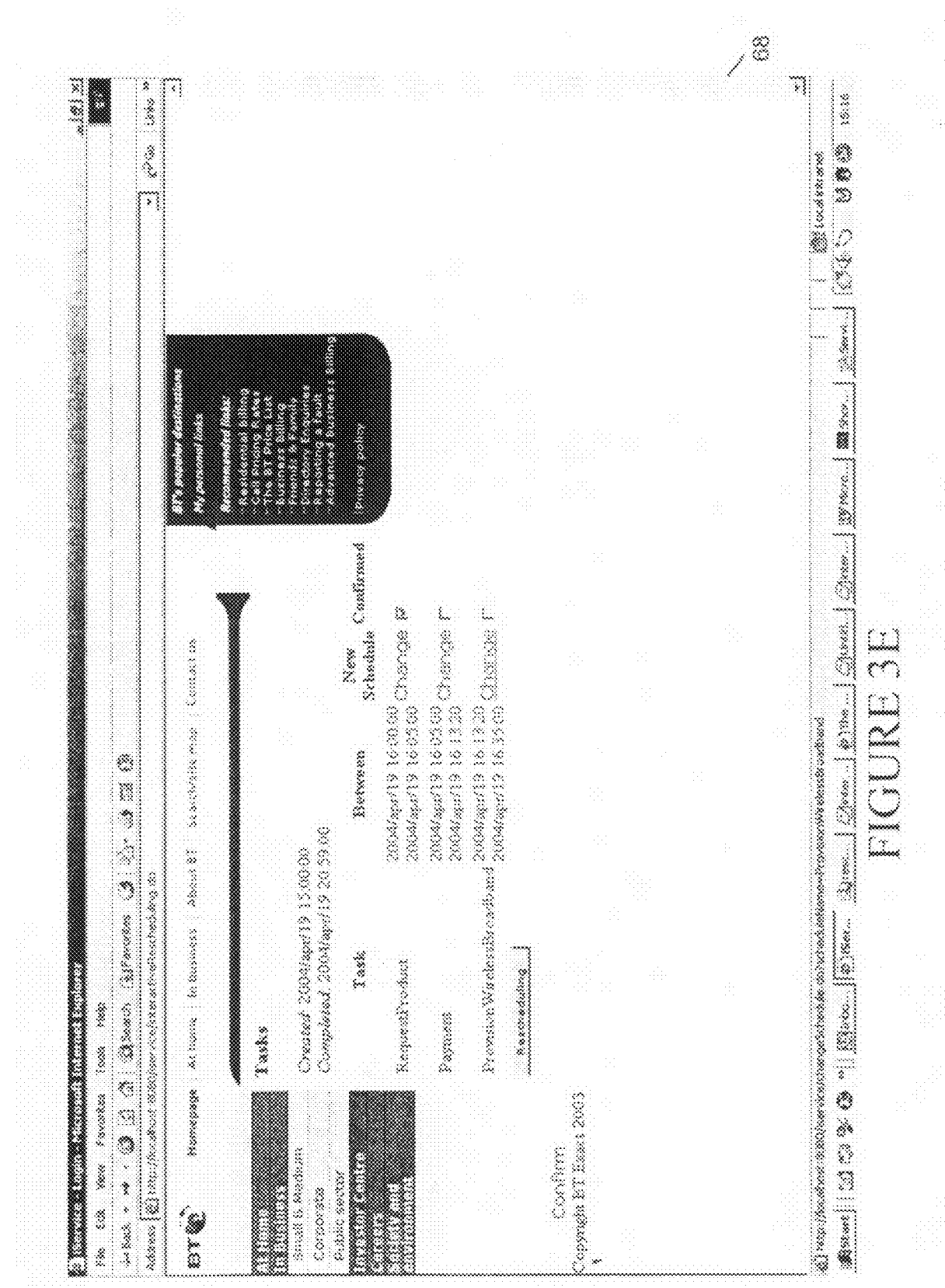

After the customer clicks on the "rescheduling" button, the iService engine will work out a new schedule, taking consideration of the customer's updated constraints. The new schedule is shown in FIG. 3E, which shows that the schedule of "RequestProduct" is refined into a smaller time-scale of (16:00-16:05) that is actually needed by a service provider. The schedule of "Payment" and "ProvisionWirelessBroadband" are both updated due to their dependency on the schedule of "RequestProduct" that has been changed.

The customer has a check of the new schedule: the schedule of "Payment" is ok, but the schedule of "ProvisionWirelessBroadband" is not ideal; the customer prefers it to be scheduled at some time after 17:00, so that he is able to finish watching an important football match. Similar to previous steps, he updates his preference of the schedule of "ProvisionWirelessBroadband" to 17:00-18:00 and asks the workflow scheduling engine to produce a new schedule that is 17:00-17:21:40, which can be seen in FIG. 3F.

Figure 3F:
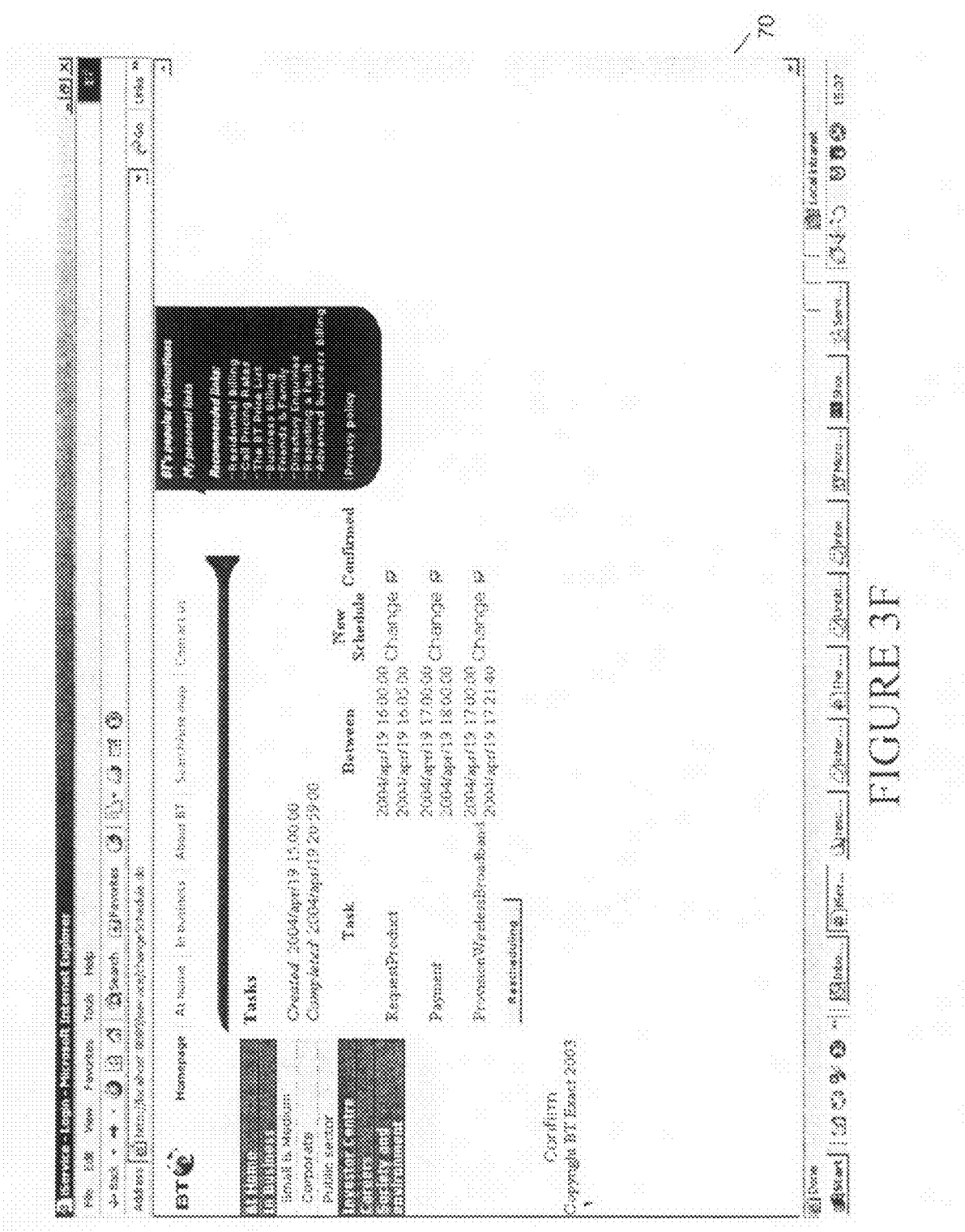
Figure 3G:
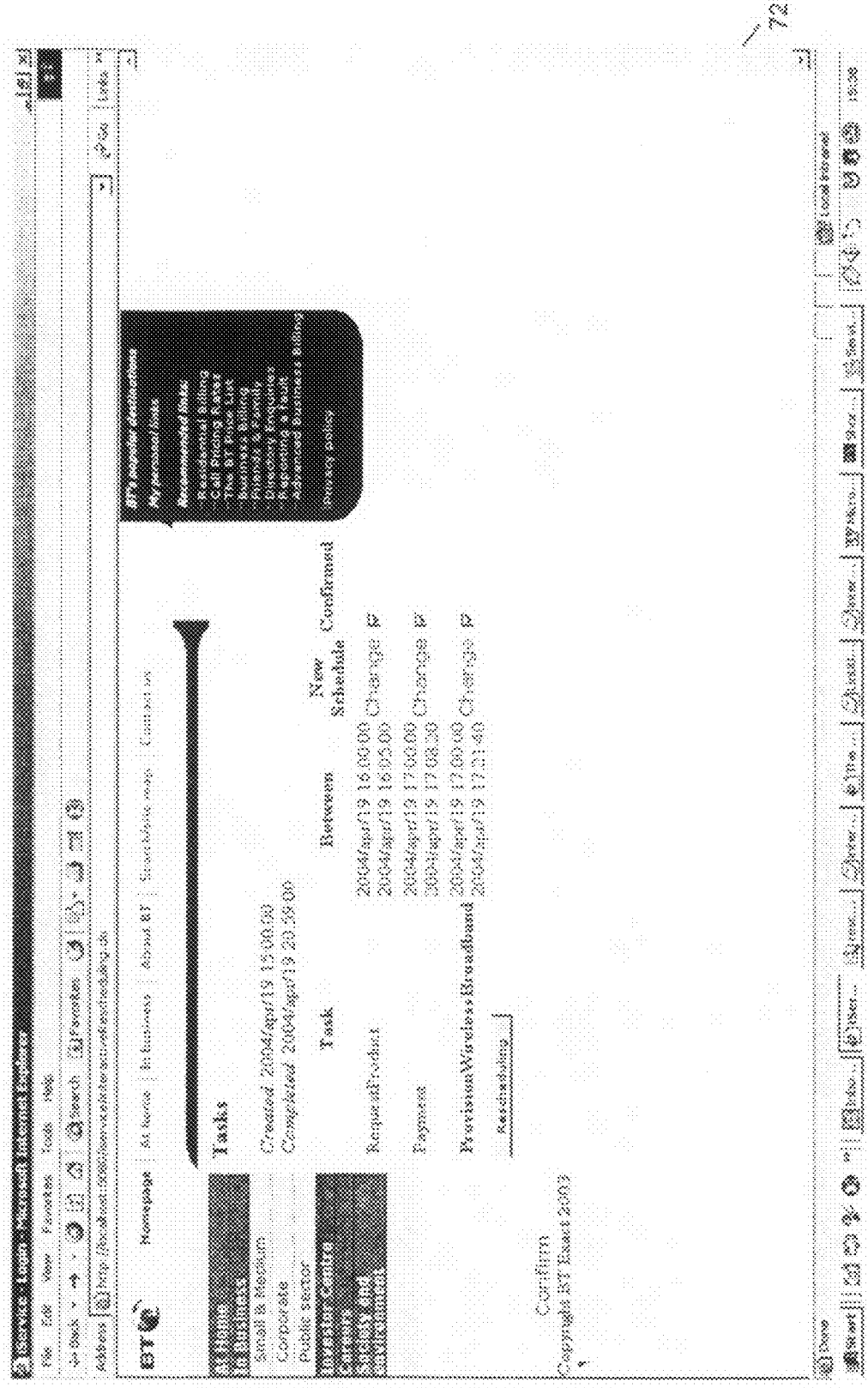

FIG. 3F also shows the change of customer's preference in the schedule "Payment", from 16:05:00-16:13:20, to 17:00-18:00. This is due to the customer's changing his mind again, to allow "Payment" to also occur after the football match. After clicking "Rescheduling", the customer is provided with a new schedule, as shown in FIG. 3G.

Figure 3H:
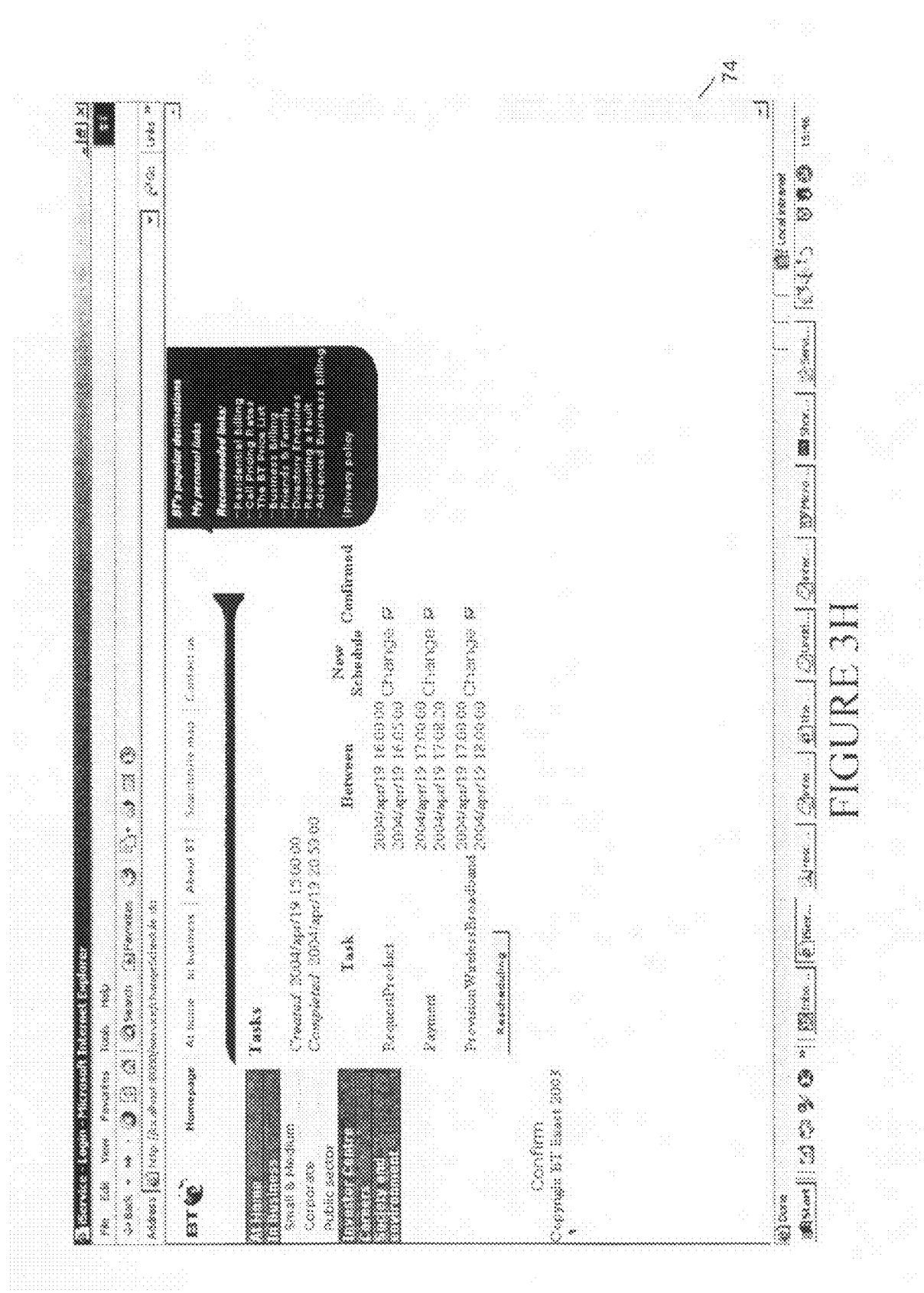
Figure 31:
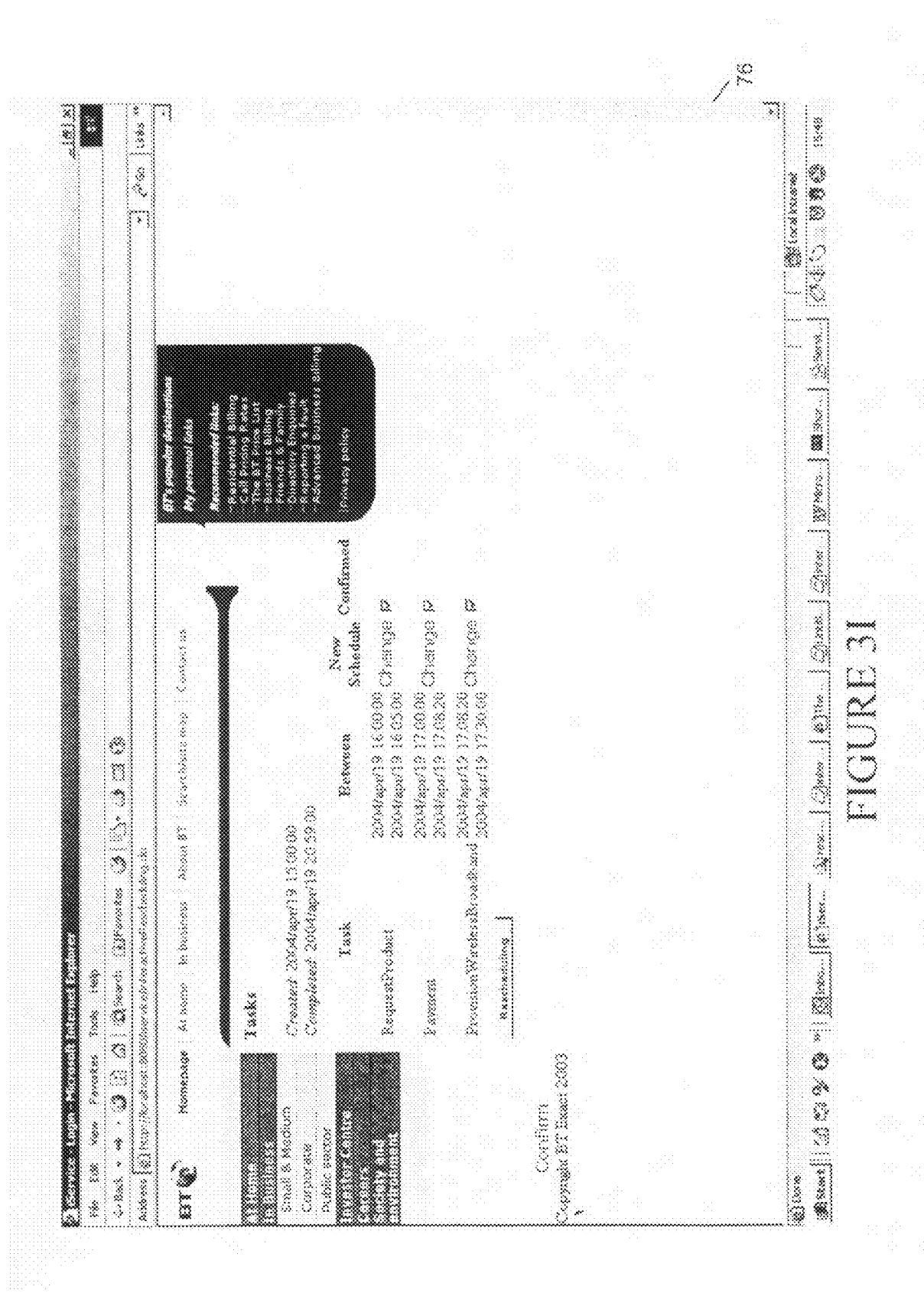

It is noticed that although a proper schedule is produced for "Payment", "ProvisionWirelessBroadband" is highlighted which indicates a conflict occurs between the schedule of "ProvisionWirelessBroadband" and the action it depends on, in this case, "Payment". This is due to the fact that schedule of "ProvisionWirelessBroadband" has been confirmed by the customer. The customer has to resolve this conflict by tuning the schedule of "ProvisionWirelessBroadband" again. By extending the preferred end time of the schedule of "ProvisionWirelessBroadband", from 17:21:40 to 18:00:00, as shown in FIG. 3H, the customer is provided with a new schedule as shown in FIG. 3I.

Figure 3J:
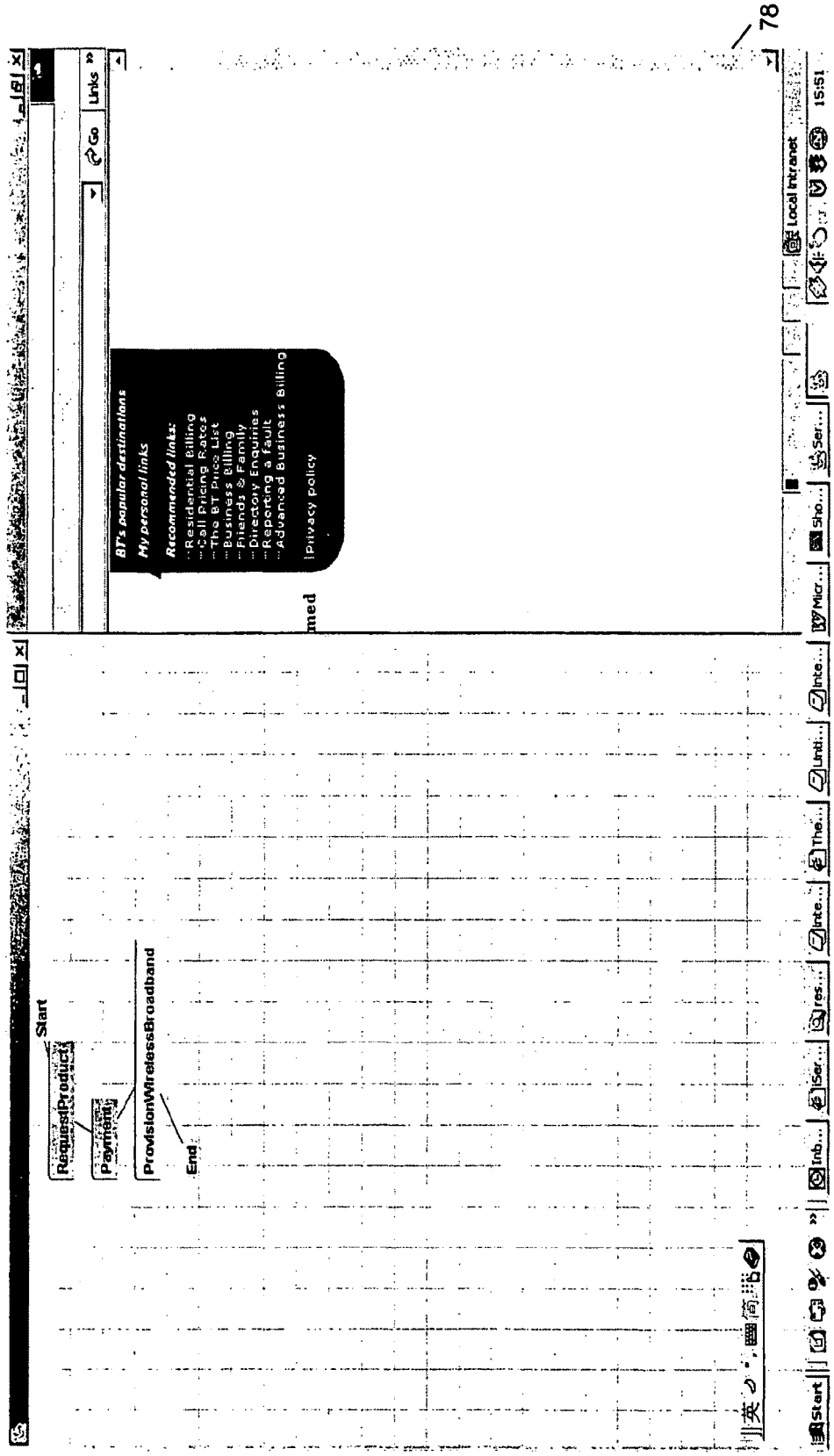

The customer is happy with the schedule of all actions listed in FIG. 3I and finally confirms the schedule of the whole workflow, by clicking "Confirm" button. The scheduled workflow is then submitted to the execution engine that will run it. The runtime status of the workflow can be monitored and traced, as shown in FIG. 3J. In FIG. 3J, on the left-hand side panel, a graphical view of the workflow is presented. The green-coloured action is the one that is currently being executed. The grey-coloured actions are those that have been successfully executed.

Thus the invention provides a workflow scheduler which provides feedback on the acceptability of a user's service request constraints to a user who has issued such a request remotely in an on-line environment. As the workflow scheduler processes the acceptability of the required actions in the context of the resources each action requires in parallel, the response can be provided rapidly in real-time. This enables, in some embodiments of the invention, for the user to be able to make repeated requests or otherwise fine-tune their initial constraint conditions. In such embodiments, the workflow scheduler functions comprises a workflow schedule optimiser whose optimisation constraints are remotely set when a user accesses the control system of the workflow scheduler on-line, for example, via a service portal.

The scheduler is non-linear and has a complexity of O(m× n), where n is the number of actions requiring a resource, and m is the average number of resources for each service type. The optimiser is iterative, in that the user can repeat the optimisation until a schedule is achieved which is satisfactory. Moreover, the optimiser enables the user to initiate changes and provides a time-bounded workflow, which enables the user to specify an upper limit on when they want a task achieved by.

The general manner in which the workflow executes actions in parallel for any given resource matrix will now be described referring to FIGS. 4 and 5 of the accompanying drawings.

Figure 4:
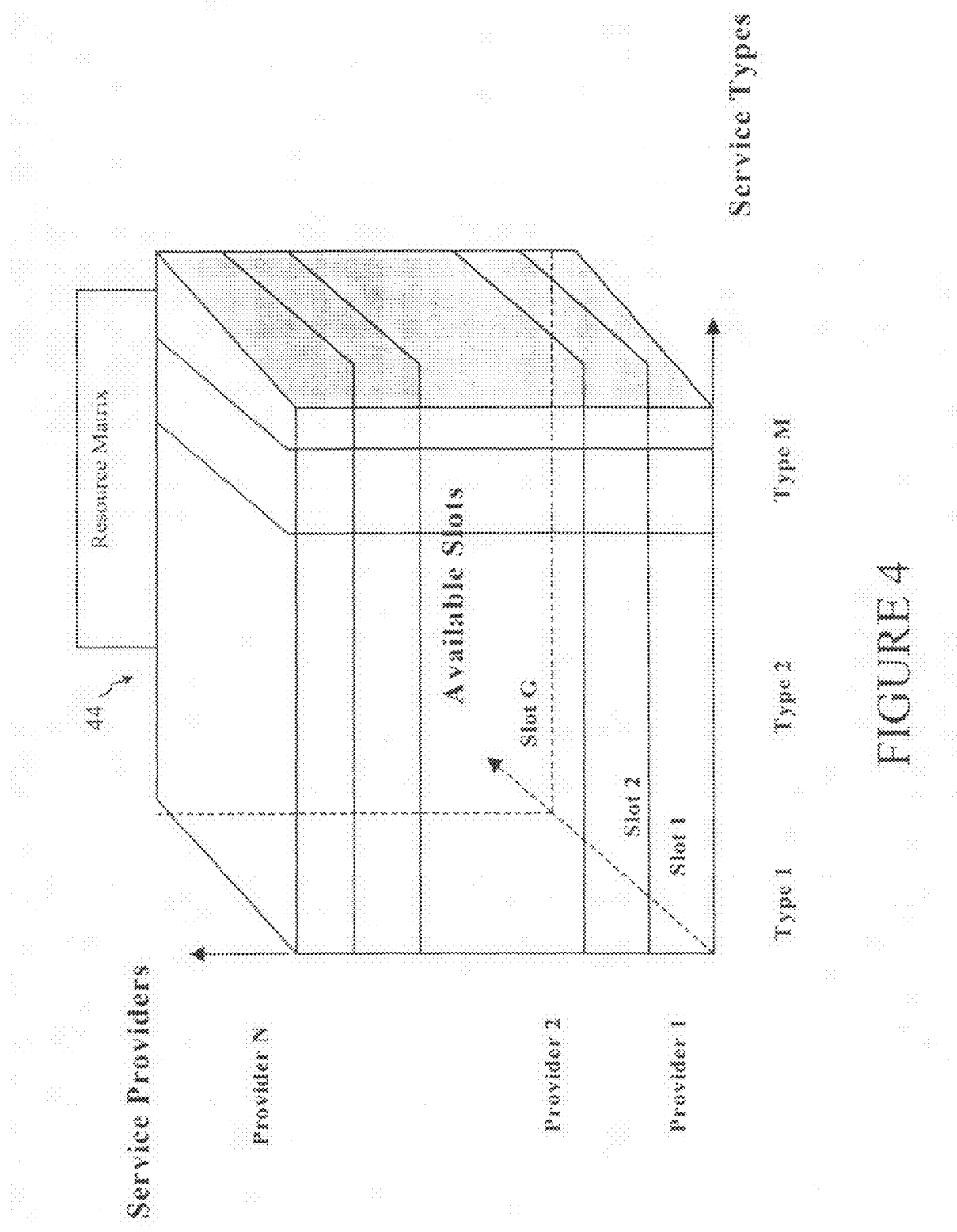
FIG. 4 shows an enlarged view of a resource matrix according to an embodiment of the invention.

FIG. 4 shows a resource matrix for a personalised workflow system according to the invention. The personal workflow system provides a method to determine the optimal allocation of available resources (e.g. engineers) to fulfil a user request (e.g. for a particular service). The resource matrix shown in FIG. 4 has a complexity n×m×g, where n is the number of service types, in this case, each service type is corresponding to an action in the personalised workflow, m is the average number of providers for each service type, and g is the availability of the resource.

Figure 5:
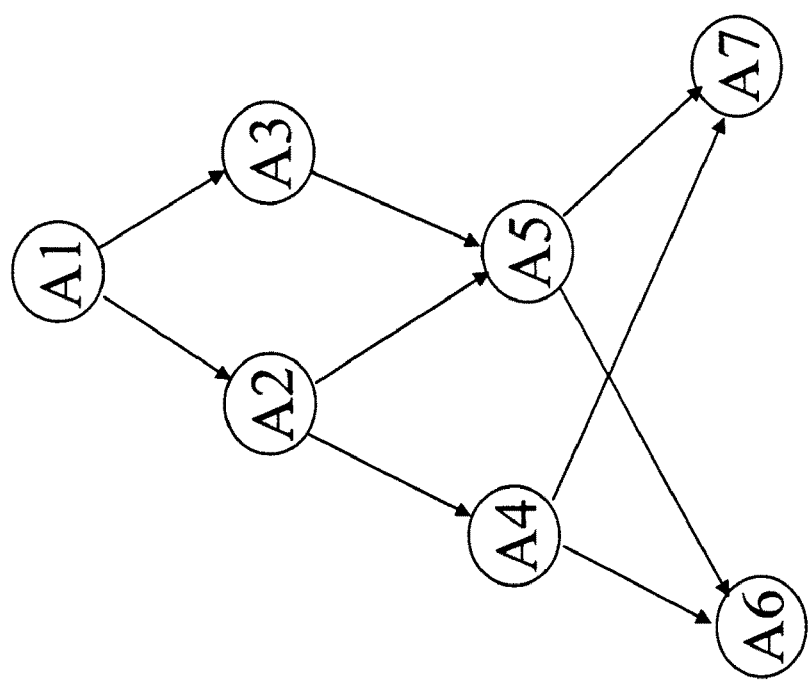
FIG. 5 shows a hierarchy of nodes in an action relationship framework according to an embodiment of the invention.

FIG. 5 shows the workflow nodes in the workflow scheduling framework which comprise actions as shown schematically in the resource matrix of FIG. 4. In FIG. 5, a series of actions A1 . . . A7 are shown which are hierarchically dependent on each other, i.e., the actions must be performed in a predetermined sequence in order to implement a specific task.

Consider the case where a user reconfigures a particular task request. This may be a direct request to reschedule when a particular action, say action A4, is to be performed or a more general request that the task is to be completed by X date etcor as a result of a changed schedule from a task it is dependent on. By requesting the workflow to be rescheduled, a local optimisation is performed by the workflow optimiser to suit both the user's own requirements (i.e., affecting action A4 and the other actions both above and below A4 for that user). The workflow scheduler must to take into account how changes to any one of the actions A1 . . . A7 affect the global utilisation of resources and seeks to optimise these.

Whilst conventional systems search and evaluate each individual dimension of the resource matrix (i.e., for each Service type, provider, available slot) prior to converging on a solution, the invention instead does not have to repeatedly look up the resource matrix to recursively make a combination of resources from the resource matrix and test each combination against the constraints that have been given to ensure that the optimum utilisation of global resources is achieved. Instead the workflow scheduler searches over the resource matrix in a highly efficient manner without the need to revisit a resource. This is achieved by dynamically decomposing the overall constraint into sub-constraints and merging with existing sub-constraints at each dimension of the resource matrix, while trying to satisfy the sub-constraint by looking up in the resource matrix and generating new sub-constraints for the dependent tasks.

Accordingly, even when the workflow as already been instantiated, the invention provides a method of rescheduling the workflow with tighter constraints which satisfy the user's requirements, enabling the user to "fine-tune" the schedule to suit their own individual needs.

Thus one embodiment of the invention provides a workflow schedule optimiser enabling a user to remotely request resources and locally optimise their requirements which also enables the system to ensure the global optimisations of the system resources. The above detailed embodiment of the invention enables the user to remotely control the local optimisation process via a customer service portal. The portal is configured to enable the user to interactively fine-tune the workflow schedule to suit the user's individual needs.

Those skilled in the art will appreciate that the term "real-time" for an action is used hereinabove in the context that a communications session is on-going between the platform providing the front end (i.e., the platform supporting the application which provides the user interface (e.g. the platform on which the web-portal is provided)) and the back-end enterprise platform (i.e., the platform(s) supporting the scheduling-related applications). In contrast, if an action occurs "off-line" it indicates that the communications session between the front and back ends has terminated.

In some embodiments the user is provided with the ability to individually control when one or more appointments is (are) scheduled, for example, by enabling the user to specify constraints which individually are maintained when the scheduling application of the back-end enterprise seeks to optimise the utilisation of resources and/or determine what actions are required to implement the service the user has requested. An example of a "service" a user might request is the installation of communications equipment and/or the activation of communications services involving communications equipment at premises which are specified by the user.

In some embodiments of the invention, the user is prompted for certain initial constraints when initially requesting the service. In other embodiments the user is additionally (or alternatively) prompted to indicate one or more constraints only once the need for certain actions for user-constraints can be imposed have been determined (by either the front end or back end application) as necessary to fulfil the service request initially generated by the user.

In this way, a user may initially indicate a deadline by when they want a service request completed, which is processed to determine a plurality of actions whose execution is necessary to fulfil the request. These actions are communicated to the user, and at this point the user is provided with the opportunity to specify individual constraints on when each individual action is performed. If any one constraint and/or if the collective constraints imposed is/are unacceptable, for example, if a constraint would result in an inconsistency in the sequence of actions whose completion is necessary to fulfil the service request, the user can be alerted to the inconsistency. The inconsistency is preferably communicated to the user in real-time, i.e., during the same communications session as the session during which the user originally imposed the constraint(s) causing the inconsistency.

The workflow scheduler and/or optimiser is capable of being implemented in software and/or hardware as a suite of one or more computer programs which, in some embodiments of the invention, are distributed over one or more supporting platforms.

Further aspects and embodiments of the invention will now be described.

Figure 6:
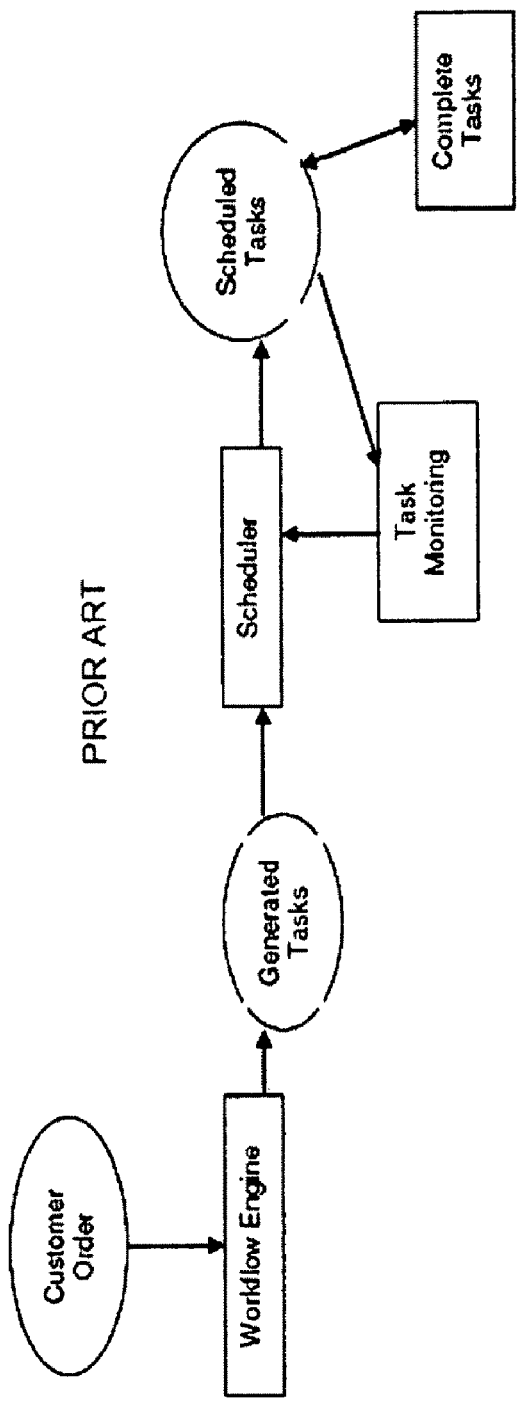
FIG. 6 is a schematic block diagram of a prior art reservation.

FIG. 6 shows the architecture of the prior art described in WO01/06426. A customer order is sent to a workflow engine, where a workflow template that fulfils this order is fetched and executed by the engine. During the execution process, tasks are generated and stored in a Generated Tasks database.

Each time a new task is generated, a scheduler can pick up this task and schedule it, with other tasks, against the availability of resource. The scheduled tasks can then be picked up by a technician; the result of the task is recorded in the database. A task monitor can constantly monitor the status of the task. If the task is overdue, the scheduler will re-schedule it to a later time slot.

The model of WO 01/06426 is not concerned with the interaction between the user and the system. Once the order is delivered, it is handled by the backend system free of user intervention. In this model, it is assumed that all the ordering information can be agreed/decided at the very beginning of the process and that no later user input is needed during the workflow execution time. Whist this may be acceptable for an Operation Support System (OSS) domain, it is not suitable for the Customer Relationship Management (CRM) domain where a close interaction between customer and the enterprise is expected. There is a need to allow a user to book, monitor, update or cancel appointments at any stage during the execution of the workflow.

The disclosure of WO01/06426 considers only job scheduling (allocating technicians to jobs) and job monitoring; it is not concerned with how a customer interacts with the front-end portal for re-service reservation. This becomes more significant when a service involve a complex workflow that has many condition points to decide which branches to follow next.

Furthermore, in WO 01/06426, the role of scheduler is limited to allocating individual technicians to tasks, which is an inflexible approach. This is because, in practice, availability information for individual technicians changes rapidly over time. By specifying an individual technician at a very early stage of the process, the system is inflexible and consequently inefficient, because at a later stage, the system may have found it more cost-effective to assign the allocated technician to another job, for example, because some jobs are delayed or failed.

Figure 7:
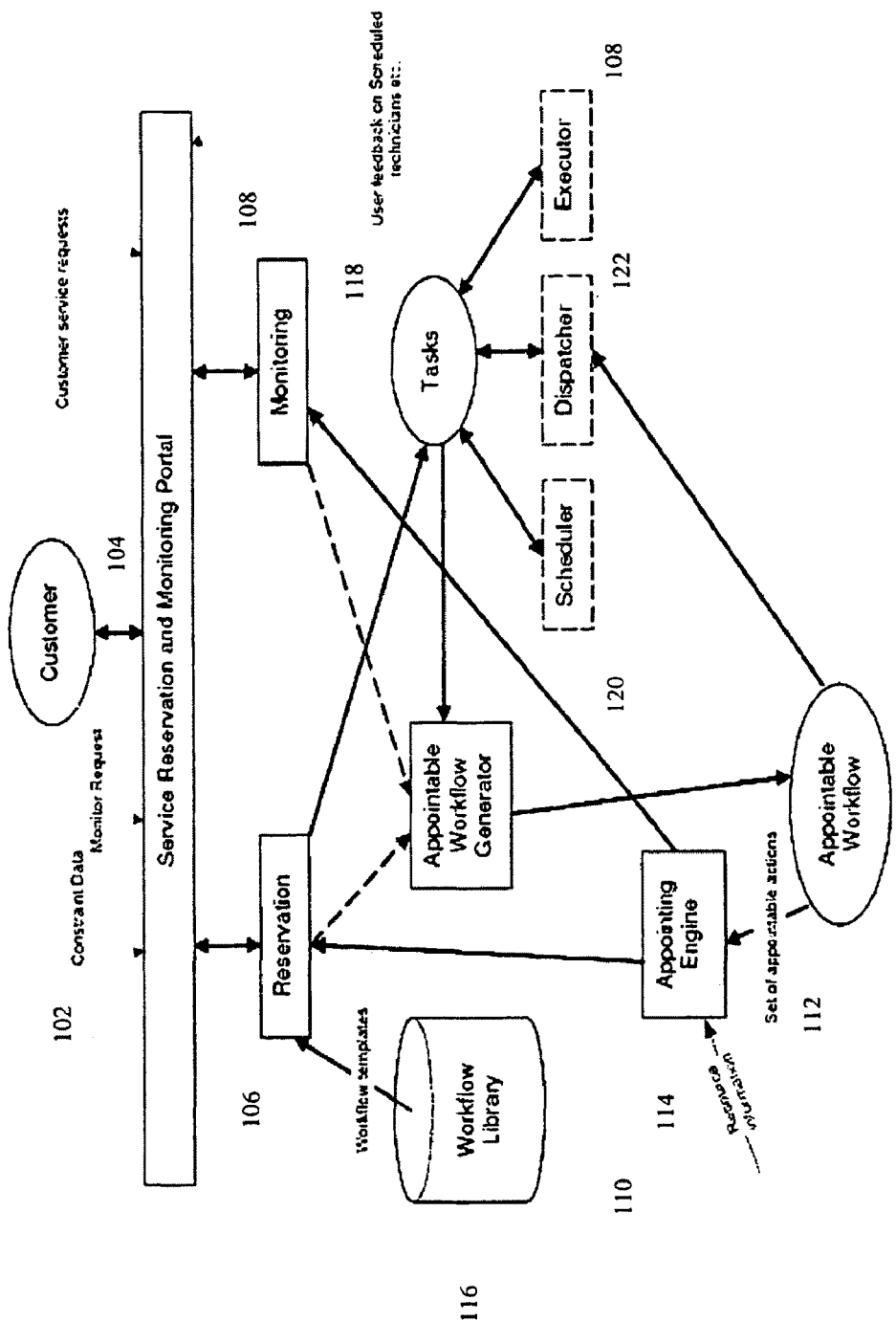
FIG. 7 is a schematic block diagram of a dynamic reservation and monitoring portal.

The invention will now be described in detail with reference to FIG. 7.

A Service Reservation and Monitoring Portal (SRMP) provides an interface between a customer 104 and the backend system which is described in more detail below.

The customer 104 can send requests via the interface 102; the set of requests typically are to place an order, to cancel an order, to update an existing appointment to accept a proposed appointment.

Formally, the requests mentioned above can be defined as (order service-name), (cancel service-name), (update appointment-name), and (accept appointments), respectively.

By looking up the execution status of the service, the SRMP 102 is able to determine whether to dispatch the customer request to a Reservation process 106 (if it is still at reservation stage) or a Monitoring process 108 (if it is at monitoring stage).

In addition to functioning as a customer request dispatch centre, the SRMP 102 can also retrieve information from the backend system (Reservation 6 and Monitoring 8 processes) and display it on a web page portal or the like, to the customer 104.

Appointable Workflow Generator

The function of the Appointable Workflow Generator (AWG) 110 is to generate an appointable workflow for a given order. In other words to generate a set of workflow events which are achievable based on present progress through the steps required to fulfil the customer order requested through the SRMP 102.

The input to the AWG 110 is a service request; formally, a service request is defined as order (service-name), where the service-name is a unique identity of the service. The output of the AWG 110 is a set of appointable workflow. An appointable workflow is defined as a workflow with a plurality of actions that are marked appointable and which are likely to have complex interdependencies.

The AWG 110 can map a service request to a workflow as defined above. It then works out appointable actions, based on the workflow as well as the current value of the conditions embedded in the workflow. This is described in more detail below.

The workflow marked by the set of appointable actions can then be rendered as an appointable workflow portion 112.

Appointing Engine

An Appointing Engine 114 functions to work out an appointing scheme, based on a resource capacity matrix as well as the appointable workflow 112. An appointing scheme is a list of appointments recommended by the system. Formally an appointing scheme is defined as {(appointment-name, start-time, end-time)}.

Figure 8:
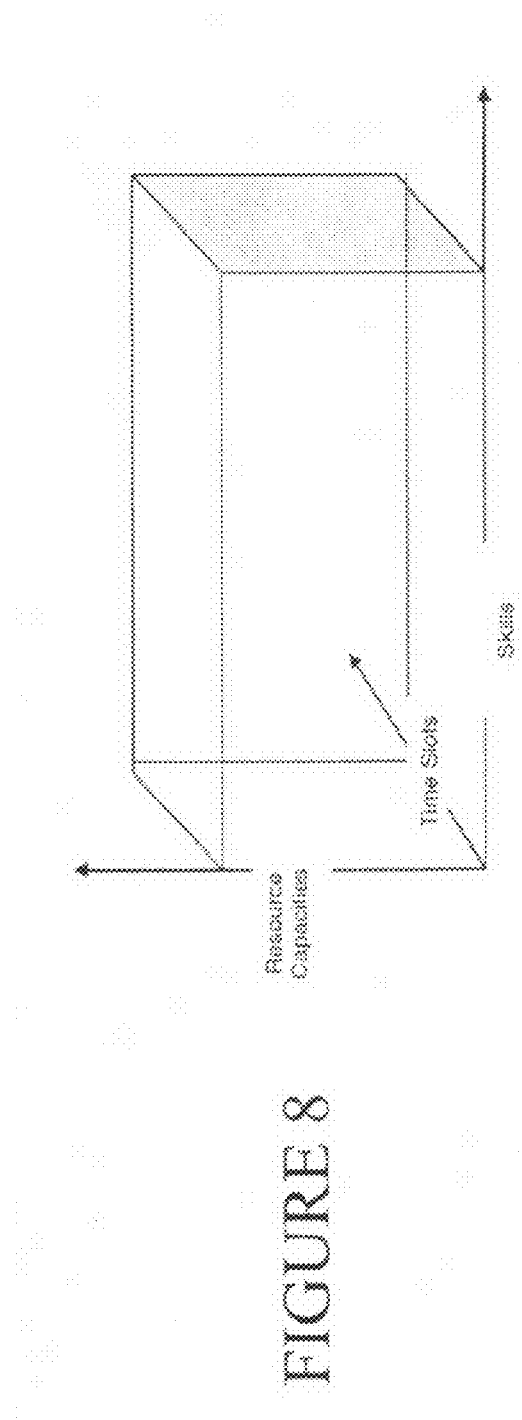
FIG. 8 is a schematic representation of a resource capacity matrix.

There are several different possible implementations of the Appointing Engine 114. In one embodiment, the Reservation process 106 uses a Resource Capacity Matrix to decide whether a specific skill at a specific time slot is available. The Resource Capacity Matrix is a three-dimension cube that spans across Skills, Time-Slots and Resource-Capacities as illustrated in FIG. 8.

A skill can be defined as (skill-name), where skill-name is the identity of a skill. A Time-Slot is a specified time period. In one embodiment, the Time-Slot may be a morning slot or afternoon slot. In another embodiment, it may be denoted as (start-hour, end-hour).

Resource capacity indicates the utilisation level of resource. In one embodiment, it may be defined as the number of technicians which have a specific skill and can do the job at specific time-slot. In another embodiment, it may be converted to a real number that takes into consideration the productivity factors (e.g. travelling time, capability etc.) for individual technicians.

Typically, the Appointing Engine 114 will traverse the appointable workflow and propagate the timing constraints across the workflow. At each action in the workflow, it computes the current timing constraint, and looks up the resource capacity matrix to see whether there is resource available for a specific skill at a specific time-slot that can satisfy such a constraint. When all the appointable actions are successfully dealt with, the Appointing Engine can recommend an appropriate appointing scheme; otherwise, it reports failure.

The function of the Reservation process 106 is to generate candidate appointments for the customers to accept. As noted above, it can respond to three kinds of customer requests: service ordering, service cancelling and appointment updating.

Service Ordering

For service ordering, the input is a specific service name. The output is a list of recommended appointments that the customer can accept or fine-tune. Formally, service ordering can be denoted as (order service-name); the list of recommended appointments can be denoted as the set {(appointment-name, start-time, end-time)}.

In one embodiment, the Reservation process 106 will use the requested service-name to look up in a Workflow Library 116 to search for a matched workflow. If such a match is found, then the found workflow will be used as one input to the (AWG 110) in the form of a template. The Reservation process 6 can then generate an appointing scheme by calling on the Appointing Engine 114, to produce candidate appointments based on the appointable workflow and an resource capacity matrix as discussed above. The appointing scheme is then presented, via the SRMP 102, to the customer.

Service Cancelling

The result of service cancelling at reservation stage is to cancel all the provisional appointments that have been presented to the customer by the appointment engine 104. Formally, the service cancelling can be denoted as (cancel service-name). The input of this function is the service-name to be cancelled.

Appointment Update (Reservation)

At service reservation stage, the function of appointment update is to fine-tune the appointments by taking consideration of any extra timing constraint imposed by the customer on the appointments.

The input to the Reservation process 106 is an appointable workflow portion as well as the customer's timing constraints on appointments. The output of the Reservation process is a list of booked appointments.

A customer's timing constraint is defined as a triple set of parameters namely: (action-name, start-time, end-time), where action-name indicates the action to be time-constrained and the start-time and end-time indicate the start time and end time of such a constraint respectively. In addition to a particular action, a timing constraint can also be imposed on the overall appointable workflow. This is often used as an initial timing constraint, based on which an appointing scheme can be proposed by the system. The appointing process can be an iterative one, in which the customer can fine-tune individual appointments that are used as additional constraints on the workflow appointing.

The output from Appointment Update is the same as that in Service Ordering, which is formally denoted as {(appointment-name, start-time, end-time)}. The function of appointing can be fulfilled by the Appointing Engine 114.

Accept Appointments

Once the customer is happy with the overall result, s/he can accept the appointments which are then booked up. The result is written as Generated Tasks held in a task database 118. The used resource capacity is also deducted from the resource capacity matrix.

Formally, the booked appointments are denoted as the set {(action-name, start-time, end-time)}, where action-name indicates the name of the action, where start-time, end-time denote the start time and end time of the booked schedule.

Monitoring Process

Monitoring is a stage after the reservation stage. After the appointments have been accepted by the customer, some tasks are generated and can be dealt with by other components such as a 120 Scheduler, a Dispatcher 122 and an Executor 124. These components are described in more detail below.

The function of the Monitoring process 108 is to observe the status changes of the tasks, as well as to accept commands from the customer to cancel the order or to update the appointments.

Cancel the Order

At the monitoring stage, all the appointments have been booked and some actions may have been completed. By cancelling an order, all the tasks that are involved in the service workflow will be removed from the Tasks table 118. Also, other stake-holders, such as Scheduler 120, Dispatcher 122 and Executor 124 will be notified of such changes, so that they can take appropriate actions.

Appointment Update (Monitoring)

The function of updating appointments after they have been accepted is to allow the customer to fine-tune the existing appointment to a different time slot. At monitoring stage, there are more sophisticated complications when trying to update appointments. For instance, an appointment that has been successfully completed is not updatable. Also, those appointments that are not appointable cannot be updated. To tackle this problem, the Appointable Workflow Generator 110 is called upon to define the scope in which the actions are appointable.

Formally, updating appointments can be denoted as (update appointments), where appointments are the appointments that need to be updated.

In one embodiment, Monitoring process 108 will first call on Appointable Workflow Generator 110 to get a list of all the appointable actions. The generation of appointable actions will take into account both the original workflow as well as the present execution status of the actions making up that workflow. The appointments that are requested to be updated will then be compared with the set of appointable actions. Once an appointment occurs in the set, it will be marked as updatable; otherwise it will not. The updating of those updatable actions can be implemented by calling on the Appointing Engine 114, where a customer's updating of the timing constraints imposed on the updatable actions are used as extra constraints input to the appointing engine 114. The engine 114 then combines this with the resource capacity matrix and workflow, to generate recommended updated appointments for the customer to choose in a similar manner to that described above.

Accept Appointments (Monitoring)

Acceptance of appointments at the Monitoring stage has two significant consequences:

Firstly, the Monitoring process 108 will cancel all the original appointments that are associated with the actions and release the booked resource capacity.

Secondly, the Monitoring process 108 will book new appointments for these actions and decrease the corresponding resource capacity.

Upon any of the actions mentioned above, the Monitoring process 8 notifies the relevant stakeholders, such as the Scheduler 120, Dispatcher 122 and Executor 124, to take appropriate actions.

Scheduler

The function of the Scheduler 120 is to allocate individual technicians to the generated tasks held in the database 118. The input of the Scheduler 120 is generated, unscheduled tasks; the output of the Scheduler 120 is generated, scheduled tasks.

Formally, unscheduled tasks and scheduled tasks are denoted as (task-name, start-time, end-time, unallocated) and (task-name, start-time, end-time, technician-name) respectively, where "unallocated" indicates that the task has not been allocated to any technician and "technician-name" indicates that the task has been allocated to a specific technician.

Figure 9:
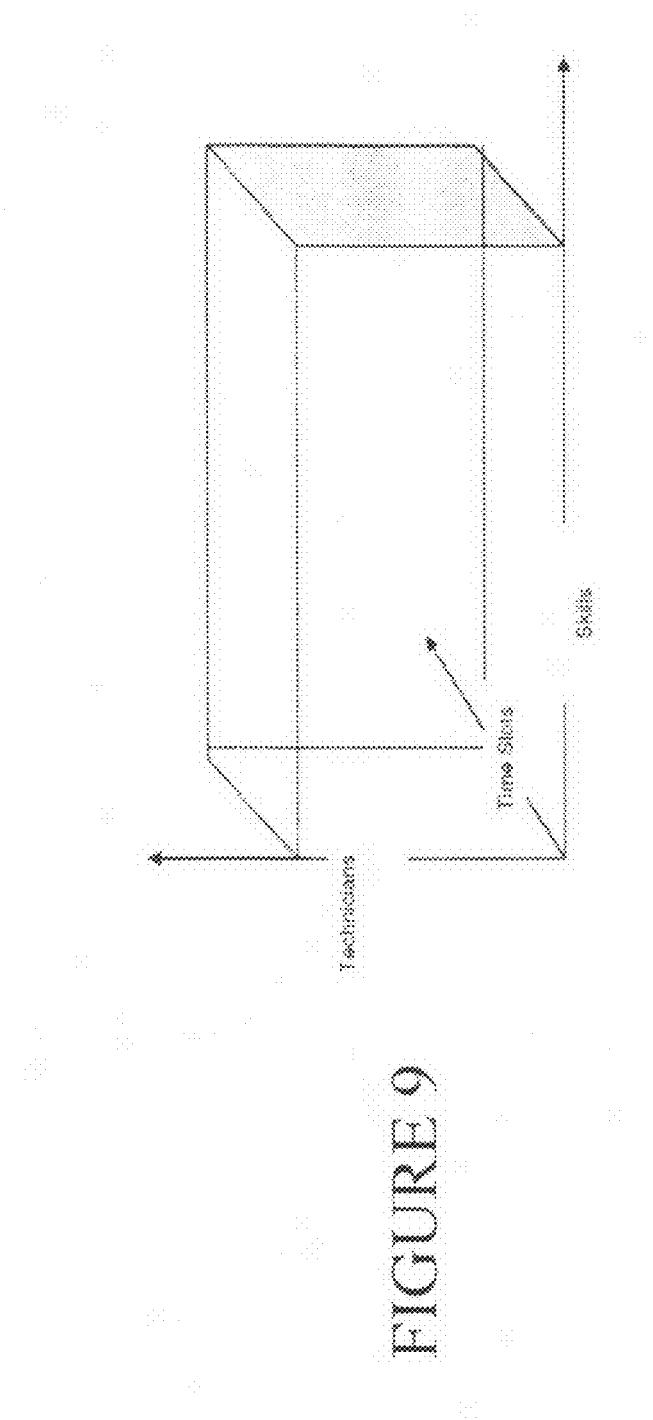
FIG. 9 is a schematic representation of a people database.
Figure 11:
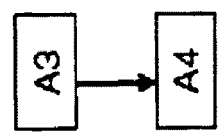
FIG. 11 is a schematic block diagram of an exemplary appointable workflow.

In one embodiment, the Scheduler 120 looks up a people database to try to find a match between a technician and a specific task. The people database can be a three-dimension cube as illustrated in FIG. 9.

People Database

Given a task to be scheduled (task-name, start-time, end-time), the scheduler will first shortlist technicians that can do the job. It then compares the available time-slots of these technicians with the time-constraint of the task. If the scheduler finds a fit, it can then allocate the technician to the task.

The Scheduler 120 also has an outer link back to the web portal (SRMP 102), via the Tasks database 118 so that the customer can observe the result of the scheduling, i.e., the name of the technician that has been allocated to the task. This can help the customer to check the identity of the technician.

Dispatcher

The role of the dispatcher 122 is to flag the executable tasks in the database 18 and make them dispatched. The input to the Dispatcher 122 is an appointable workflow portion as well as generated tasks. The output from Dispatcher is a list of generated tasks that have been flagged "dispatched".

A scheduled task takes the form of (task-name, start-time, end-time, technician), as described previously. The criteria of switching the status of task from "scheduled" to "dispatched" is based on whether all the precedent tasks of a specific task have been successfully executed. Formally, a dispatched task can be described as (task-name, start-time, end-time, dispatched).

In one embodiment, the Dispatcher 122 traverses through the appointable workflow to switch the task status from "scheduled" to "dispatched", in turn.

Executor

The function of the Executor 124 is to pick up tasks that are executable to execute them and to provide support for scheduled tasks e.g. by providing the necessary information to the resource allocated to a dispatched task. The Executor could have its own resources for the task, or else refer to an external resource for the purpose. Once the tasks have been completed, their status is set to "completed". The input of the Executor 124 is generated tasks that have been dispatched, denoted as (task-name, start-time, end-time, dispatched). The output from the Executor 124 is completed tasks that are denoted as (task-name, start-time, end-time, completed).

Tasks and Event Dispatcher

A Task is defined as (task-name, status). The task-name is an identity of the task and the status indicates different stages of the life cycle of the task. Formally, we have status={reserved, scheduled, dispatched, completed}.

As the changes in the Tasks database 118 may have effect on some or all the stakeholders, such as Reservation, Monitoring, Scheduler, Dispatcher and Executor, it is needed that such changes be informed to those stakeholders. In one embodiment, an event-listener mechanism is used to implement this requirement.

As noted above and described in detail below, the interrogation of these states allows appointments to be varied in real-time following re-processing by the appointable workflow generator 10. This is a significant advantage over the prior art solutions.

Decision Rules for Actions

As there are multiple stakeholders of Tasks, such as Reservation, Monitoring, Scheduler, Dispatcher and Executor. A set of rules are defined to coordinate the behaviour of these stakeholders.

Reservation

The reservation process 106 interacts with the Tasks database 118 only when the customer accepts the appointments and new tasks are generated and stored in the database 118. Thus:

Rule A: all reserved tasks can be inserted into Tasks unconditionally at Reservation stage.

Monitoring

The Monitoring process 108 can interact with the Tasks database 118 in two ways: first, it can cancel all the tasks that are associated with a service order, regardless of the status of these tasks; second, it can add new reserved tasks as replacement for cancelled tasks. Thus:

Rule B: all the tasks can be cancelled from Tasks unconditionally at Monitoring stage.

Rule C: all the tasks can be inserted into Tasks unconditionally at Reservation stage.

Scheduler

The Scheduler 120 is responsible for scheduling reserved and scheduled tasks, to allocate individual technicians to those tasks. When the scheduler 120 schedules the reserved tasks, it allocate technicians to new tasks; when the scheduler 120 schedules already-scheduled tasks, it tries to optimise the enterprise cost model by re-allocating another technician to a task. Thus:

Rule D: all the reserved and scheduled tasks can be scheduled at Monitoring stage.

Dispatcher

The Dispatcher 122 carries out the function of dispatching tasks to technicians only when a condition is met, e.g., the precedent actions have been successfully completed. Thus:

Rule E: a scheduled task can be dispatched if and only if its precedent tasks have been completed.

Executor

The Executor 124 is arranged to pick up a task that has been dispatched. In one embodiment, the dispatch could take the form of sending a task description to a technician's PDA, so that the technician can execute the task. Thus:

Rule F: a dispatched task can be executed.

Detailed Operation of the Appointable Workflow Generator

The appointable workflow generator 110 checks the appointability of workflow and finds an appointable workflow portion during the execution of the workflow as described briefly above.

As noted above, to cope with a complex workflow, a close interaction between the customer and the system is desirable to monitor the progress of workflow, determining when and to what extent it is possible to make an appointment. FIG. 7 shows the proposed architecture.

The customer can have continuous interaction with the system, via the SRMP 102. Once a service request is put forward to the system, again, a workflow template that fulfils this service will be fetched. Instead of going directly to a scheduler as in the prior art, the customer can check the appointability of the workflow using the Appointable Workflow Generator 110; the result is a portion of workflow that can then be fed back to the customer for appointment making. The customer can book appointments based on this workflow portion against the availability of enterprise resource.

The role of the Appointable Workflow Generator 110 is to enable an appointability check of workflow at execution time. The customer can ask questions such as: What is the appointable portion of the workflow? Will the current selected appointments still be in an appointable workflow time window?

Figure 10:
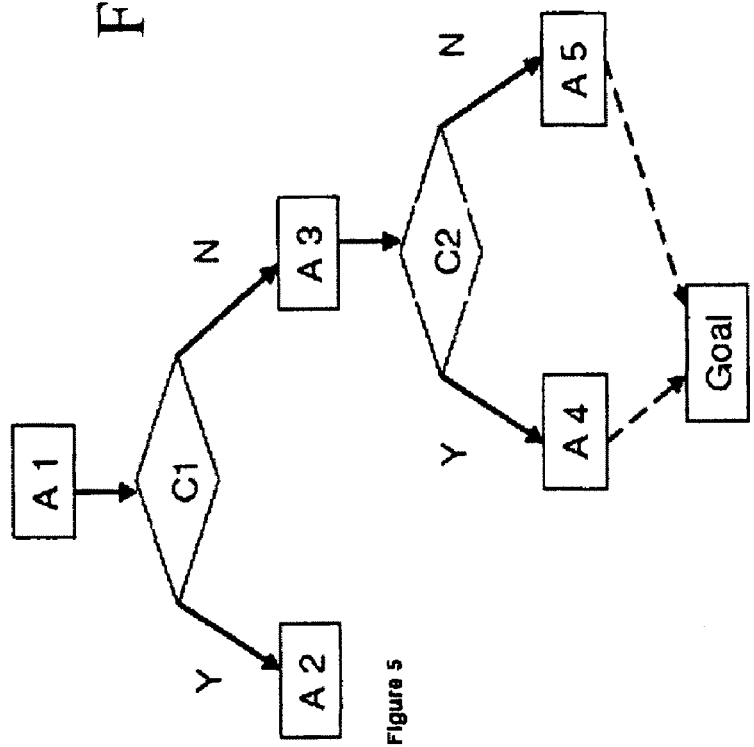
FIG. 10 is a schematic block diagram of an exemplary workflow.

As noted above, a workflow can be modelled as a set of actions together with the logical dependencies among these actions. Informally, we have a workflow language that contains program constructs for building workflows. These constructs include:

i. Variable definition ii. Expression—arithmetic, comparison, logic iii. Action iv. Assignment v. Control flow—sequence, parallel, switch FIG. 10 shows an example of such a workflow. Typically the workflow will be derived from one or more template workflows stored in the workflow library 116. The templates are selected based on orders received from the customer via the SRMP 102. The intended result of the order is to achieve a goal 130 such as the completed installation of a new service.

At execution time, the value of control flows C1 and C2 can be calculated dynamically as information arrives. The picture of appointable workflow (i.e. which actions can have appointments made for them on the basis of present progress and information) changes progressively. Here are some examples:

Example 1: we are at the beginning of action A1 and none of control flows C1 or C2 can be evaluated at the current time. In this case, the appointable workflow will be just action A1, because regardless of whether C1 can be evaluated to be true, A1 is a necessary step to go forward towards a goal.

Example 2: action A1 has been completed and C1 can be evaluated to be true. In this case, there is no appointable workflow, because action A2 will not lead to the goal 30.

Example 3: action A1 has been completed and control flows C1, C2 can be evaluated to N, Y respectively. In this case, we have appointable workflow of action A3 and action A4. FIG. 6 shows this appointable workflow.

Some of the appointability rules are:

Rule G: those actions that have been successfully finished are not appointable.

Rule H: a decision point may be followed by several branches. If none of the actions following the decision point involve a potential appointment, we can simply choose the longest duration as the duration of the decision point, and include it as part of the appointable workflow.

Formally, we have the following algorithm to decide the appointability of workflow. But first we need to define the language.

Definition of Workflow Language

```
Statement::= Action | Assignment | SequenceStatement |
ParallelStatement | SwitchStatement
Action ::= ActionName(Inputs, Outputs)
Assignment ::= Variable <- Expression
SwitchStatement ::=    <switch>
                       SwitchCases
                       </switch>
SwitchCases ::=        SwitchCase
                       | SwitchCase SwitchCases
SwitchCase ::=         LogicExpression Statement
SequenceStatement ::= <sequence>
                       Statement
                       | Statement ; SequenceStatement
                       </sequence>
ParallelStatement ::=  <parallel>
                       Statement
                       | Statement ^ ParallelStatement
                       </parallel>
Variable ::= identifier
Expression ::= LogicExpression | ComparisonExpression |
ArithmeticExpression
```

For simplicity, we do not detail the definition of the workflow language at expression level, but the skilled person will appreciate that the population of the high level concepts disclosed herein at expression level may be achieved using conventional programming methods.

Algorithms

Two algorithms work together to carry out the function of identifying an appointable workflow portion. The first algorithm decides the appointability of a statement in a workflow; the second algorithm traverses the appointable statements (e.g. actions) to identify a contiguous appointable workflow portion. To give the customer a better degree of flexibility, we allow the customer to set up a preference regarding how accurate s/he wants the appointable workflow to be. Currently, we have two categories of such preference: maximum appointable workflow portion and minimum appointable workflow portion.

The trade-off between the two is the potential duration of the whole workflow through to the end goal 130 and the number of appointments which may be fixed into the future. If appointments have to be fixed well in advance (maximum workflow) then the system must make safe assumptions about meeting time targets which will probably lead to a longer duration for the whole workflow.

To get a maximum appointable workflow portion:—

Let Appointable(statement) denote the function of deciding whether a statement/workflow is appointable. We have:

```
Appointable(Statement) ::=   Appointable(Action)
                             | Appointable(Assignment)
                             | Appointable(SwitchStatement)
                             | Appointable(SequenceStatement)
                             | Appointable(ParallelStatement)
Appointable(Action) ::=
IF the action has been completed THEN
    Return true;
ELSE IF the action does not require appointment THEN
    Return true;
ELSE IF the duration of the action is known THEN
    Return true;
ELSE
    Return false;
ENDIF
Appointable(Assignment) ::= Return true;
Appointable(SwitchStatement) ::= Appointable(SwitchCases)
Appointable(SwitchCases) ::= Appointable(SwitchCase)
                             | Appointable(SwitchCase)
                             ^ Appointable(SwitchCases)
Appointable(SwitchCase) ::= Appointable(Statement)
Appointable(SequenceStatement) ::= Appointable(Statement)
                             | Appointable(Statement)
                             ^ Appointable(SequenceStatement)
Appointable(ParallelStatement) ::= Appointable(Statement)
                             | Appointable(Statement)
                             ^ Appointable(ParallelStatement)
```

Note that the maximum appointable workflow portion comes when the conditions of the branches in the workflow cannot be evaluated at runtime, in that case we can assume that the duration of the workflow is the maximum duration among those branches.

And to generate the corresponding appointable workflow portion

Let GenerateAppointable(statement) denote the function of generating an appointable workflow portion.

Let AppointableWorkflow <- nil;

```
GenerateAppointable(Statement) ::=   GenerateAppointable(Action)
                                     | GenerateAppointable(Assignment)
                                     | GenerateAppointable(SwitchStatement)
                                     | GenerateAppointable(SequenceStatement)
                                     | GenerateAppointable(ParallelStatement)
GenerateAppointable(Action) ::=
    IF Appointable(Action) THEN
        AppointableWorkflow <- Action;
    ENDIF
GenerateAppointable(Assignment) ::=
GenerateAppointable(SwitchStatement) ::= GenerateAppointable(SwitchCases)
GenerateAppointable(SwitchCases) ::=
    IF NOT(Appointable(SwitchCases)) THEN
        Return;
    ENDIF
    FOR I <- 1 TO n DO
        GenerateAppointable(SwitchCase(i));
    ENDFOR
```

To Get a Minimum Appointable Workflow Portion:

Let Appointable(statement) denote the function of deciding whether a statement/workflow is appointable. We have:

```
Appointable(Statement) ::=   Appointable(Action)
                           | Appointable(Assignment)
                           | Appointable(SwitchStatement)
                           | Appointable(SequenceStatement)
                           | Appointable(ParallelStatement)
Appointable(Action) ::=
    IF the action has been completed THEN
        Return true;
    ELSE IF the action does not require appointment THEN
        Return true;
    ELSE IF the duration of the action is known THEN
        Return true;
    ELSE
        Return false;
    ENDIF
Appointable(Assignment) ::= Return true;
Appointable(SwitchStatement) ::= Appointable(SwitchCases)
Appointable(SwitchCases) ::=   Appointable(SwitchCase)
                             | Appointable(SwitchCase) ||
                               Appointable(SwitchCases)
Appointable(SwitchCase) ::=
    IF isEvaluatable(condition) ^ (Condition == true) ^
       Appointable(Statement) THEN
        Return true;
    ELSE
        Return false;
    ENDIF
Appointable(SequenceStatement) ::=   Appointable(Statement)
                                   | Appointable(Statement)
                                     ^ Appointable(SequenceStatement)
Appointable(ParallelStatement) ::=   Appointable(Statement)
                                   | Appointable(Statement)
                                     ^ Appointable(ParallelStatement)
```

Note that the minimum appointable workflow portion comes when the conditions of the branches in the workflow can be decided at the current time; otherwise we treat it as non-appointable. This is likely to lead to a shorter workflow portion with a smaller number of statements flagged appointable but is probably more accurate.

To generate a corresponding appointable workflow portion (based on the preference of obtaining a minimum appointable workflow portion)

Let GenerateAppointable(statement) denote the function of generating an appointable workflow portion.

Let AppointableWorkflow <- nil;

```
GenerateAppointable(Statement) ::=   GenerateAppointable(Action)
                                   | GenerateAppointable(Assignment)
                                   | GenerateAppointable(SwitchStatement)
                                   | GenerateAppointable(SequenceStatement)
                                   | GenerateAppointable(ParallelStatement)
GenerateAppointable(Action) ::=
    IF Appointable(Action) THEN
        AppointableWorkflow <- Action;
    ENDIF
GenerateAppointable(Assignment) ::=
GenerateAppointable(SwitchStatement) ::= GenerateAppointable(SwitchCases)
GenerateAppointable(SwitchCases) ::=
    FOR I <- 1 TO n DO
        IF (Appointable(SwitchCase)) THEN
            GenerateAppointable(SwitchCase);
            Return ;
        ENDIF
    ENDFOR
GenerateAppointable(SwitchCase) ::= GenerateAppointable(Statement)
GenerateAppointable(SequenceStatement) ::=
    FOR I <- 1 TO n DO
        IF Appointable(Statement(i)) THEN
            GenerateAppointable(Statement(i));
        ELSE
            Return;
        ENDIF
    ENDFOR
GenerateAppointable(SwitchCase) ::= GenerateAppointable(Statement)
GenerateAppointable(SequenceStatement) ::=
    FOR I <- 1 TO n DO
        IF Appointable(Statement(i)) THEN
            GenerateAppointable(Statement(i));
        ELSE
            Return;
        ENDIF
    ENDFOR
GenerateAppointable(ParallelStatement) ::=
    IF NOT(Appointable(ParallelStatement)) THEN
        Return;
    ENDIF
    FOR I <- 1 TO n DO
        GenerateAppointable(Statement(i));
    ENDFOR
```

```
GenerateAppointable(ParallelStatement) ::=
    IF NOT(Appointable(ParallelStatement)) THEN
        Return;
    ENDIF
    FOR I <- 1 TO n DO
        GenerateAppointable(Statement(i));
    ENDFOR
```

Detecting an Appointable Workflow Portion

Following the algorithms set out above, we have AppointableWorkflow that contains a set of appointable actions. It should be noted that this set of appointable actions also include the actions that have been completed. Let AppActions be the set of appointable actions, ComActions be the set of completed actions, AppWorkflow be appointable workflow, we have AppWorkflow<-AppActions−ComActions.

What-if Analysis

Furthermore, the system allows the customer to set values to conditions for simulation purposes and play What-if analysis. Once these conditions have been set up, the conditioned workflow can be input into the system, and the output from the system can be used to decide the appointable workflow portion.

Dynamic Analysis

Dynamic analysis refers to the execution of workflow, during which period the value of the environmental variables may be used to evaluate the conditions in the workflow. Also known is the execution status of actions i.e. some actions are completed and some actions are on-going. All these kinds of information can be put together into the workflow appointability generator and used as inputs into the system. The output of the system will suggest the appointable workflow portion.

SUMMARY

Thus in summary, the system described above:

Manages the whole life-cycle of service reservation that spans across service ordering, service reservation, job scheduling, job dispatching, job execution, job monitoring.

Supports appointability-check and appointment-update both at the stage of service reservation as well as at the stage of service monitoring.

Introduces a new concept of booking on resource capacity, rather than booking on individual technicians, which can provide a more robust appointing scheme and reduce the risk of breaking promises to the customer.

Offers a set of rules that operate on the states of disparate functional modules and can help detect whether customer requests are orderable, appointable, reservable, schedulable, dispatchable, and/or executable.

Those skilled in the art will appreciate that alternative steps and components and modifications thereto exist which are functionally equivalent to the steps and components described herein above in the context of the invention. Accordingly, the scope of the invention is not limited to the specific features described in the context of the embodiments detailed above, but instead is defined by the scope of the accompanying claims.

The invention claimed is:

1. An interactive workflow scheduling system comprising at least one programmed computer configured to provide:
a front-end platform supporting a web-portal to an interactive workflow scheduler;
a back-end hardware platform supporting a real-time scheduling application;
an interface arranged to support data communication between the web-portal provided by the front-end platform and the real-time scheduling application provided by said back-end platform over a communications network;
an interface arranged to enable user input of one or more user-specified constraint conditions when a user-requested workflow request is generated during an on-line communications session between the user and the front-end platform;
wherein the interactive workflow scheduler generates an abstract instantiation of a workflow responsive to said workflow request, the abstract instantiation of the workflow comprising a plurality of actions having a predetermined dependency relationship,
wherein the interactive workflow scheduling system is arranged to enable user-specified constraint conditions to be received via said web-portal provided on the front-end platform to control in real-time the configuration by said real-time scheduling application of said abstract instantiation of said workflow when generating a scheduled workflow,
wherein said real-time scheduling application includes:
a workflow generator arranged to generate a scheduled workflow in real-time dependent on said user-specified constraint conditions for the abstract instantiation of the workflow generated by said interactive workflow scheduler during the on-line communications session between the front-end platform and back-end platform, the scheduled workflow which is generated satisfying said one or more user-specified constraint conditions, and
wherein the real-time scheduler application optimizes the global utilization of the resources required to fulfill said user-requested constraints for said abstract instantiation of said workflow by processing in parallel the resource requirements of each of said plurality of actions required by the scheduled workflow during said on-line communications session,
wherein a scheduled workflow for said abstract instantiation of said workflow is regenerated responsive to reiterated user constraint conditions being inputted during said communications session.

2. An interactive workflow scheduling system as claimed in claim 1, wherein said predetermined dependency relationship of said plurality of actions comprises a hierarchical relationship.

3. An interactive workflow scheduling system as claimed in claim 1, wherein said real-time workflow scheduling application generates said scheduled workflow using user-specified constraints comprising conditions selected from the group consisting of:
a user preference;
confirmed appointments;
temporal dependency between actions; and
backend resource availability.

4. An interactive workflow scheduling system as claimed in claim 1, further comprising:
an aggregator arranged to aggregate individual scheduled actions in a generated workflow into a single appointment whenever a predetermined condition is satisfied.

5. An interactive workflow scheduling system as claimed in claim 1, further comprising an aggregator arranged to aggregate individual scheduled actions in a generated workflow into a single appointment whenever a predetermined condition is satisfied, wherein said predetermined condition comprises the time scheduled for said tasks being less than a predetermined time-duration.

6. An interactive workflow scheduling system as claimed in claim 1, wherein said real-time workflow scheduling application comprises:
   a real-time reservation system,
   a reservation portal,
   a workflow library, and
   an appointable workflow generator,
   wherein the reservation portal is arranged to receive said user input identifying a service request and said user-specified constraint data, said constraint data defining user constraints on the making of appointments,
   wherein the workflow library comprises a plurality of workflow templates each comprising a plurality of at least partially interdependent actions and each being mapped to a predetermined type of service request, and
   wherein the appointable workflow generator is arranged to receive the user-specified constraint data from the reservation portal and is arranged to process one of said workflow templates to generate an appointable workflow comprising a set of appointable actions, taking account of the constraint data, and the interdependencies between actions in the workflow template, whereby the reservation system is able to generate a scheduled workflow comprising multiple appointments for interdependent actions.

* * * * *